United States Patent [19]

Okumura et al.

[11] Patent Number: 5,494,016

[45] Date of Patent: Feb. 27, 1996

[54] IGNITION TIMING CONTROL APPARATUS FOR AN INTERNAL COMBUSTION ENGINE

[75] Inventors: Hiroshi Okumura, Kariya; Koji Sakakibara, Hekinan; Naoki Kokubo, Aichi, all of Japan

[73] Assignee: Nippondenso Co., Ltd., Japan

[21] Appl. No.: 378,286

[22] Filed: Jan. 26, 1995

[30] Foreign Application Priority Data

| Jan. 26, 1994 | [JP] | Japan | 6-007023 |
| Jun. 9, 1994 | [JP] | Japan | 6-127868 |

[51] Int. Cl.⁶ ................................................. F02P 5/15
[52] U.S. Cl. ................................................. 123/424
[58] Field of Search ........................... 123/414, 415, 123/416, 424

[56] References Cited

U.S. PATENT DOCUMENTS

| 4,226,219 | 10/1980 | Olmstead | 123/424 |
| 4,844,034 | 7/1989 | Honjo et al. | 123/424 |
| 4,913,124 | 4/1990 | Hashizume | 123/424 |
| 4,953,531 | 9/1990 | Abe | 123/424 |
| 4,982,712 | 1/1991 | Abe | 123/424 |
| 5,123,390 | 6/1992 | Okuda | 123/424 |

FOREIGN PATENT DOCUMENTS

| 0026775 | 2/1988 | Japan . |
| 0080076 | 4/1988 | Japan . |
| 0325776 | 11/1992 | Japan . |
| 0141303 | 6/1993 | Japan . |

Primary Examiner—Willis R. Wolfe
Attorney, Agent, or Firm—Cushman Darby & Cushman

[57] ABSTRACT

A signal rotor 6 rotates in synchronism with a crank shaft of the internal combustion engine. A pickup sensor 7 is disposed in a confronting relation to the signal rotor 6 to generate an angle signal S1 proportional to rotation of the internal combustion engine. An ignition signal producing means (31, 32) calculates an ignition timing on the basis of the angle signal S1 and generates an ignition signal (S41, S42) for igniting the internal combustion engine. A time mask means monitors a parameter representative of a battery voltage Vs, and prohibits the angle signal S1 from entering into the ignition signal producing means for a predetermined time in response to a detection of a predetermined amount fluctuation of the parameter.

15 Claims, 14 Drawing Sheets

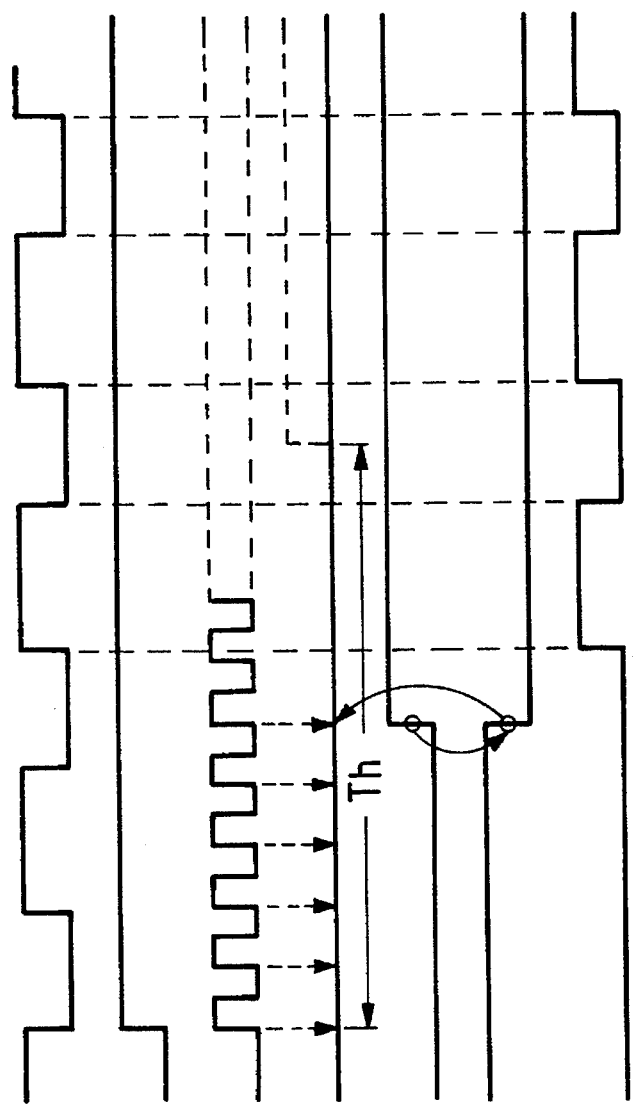

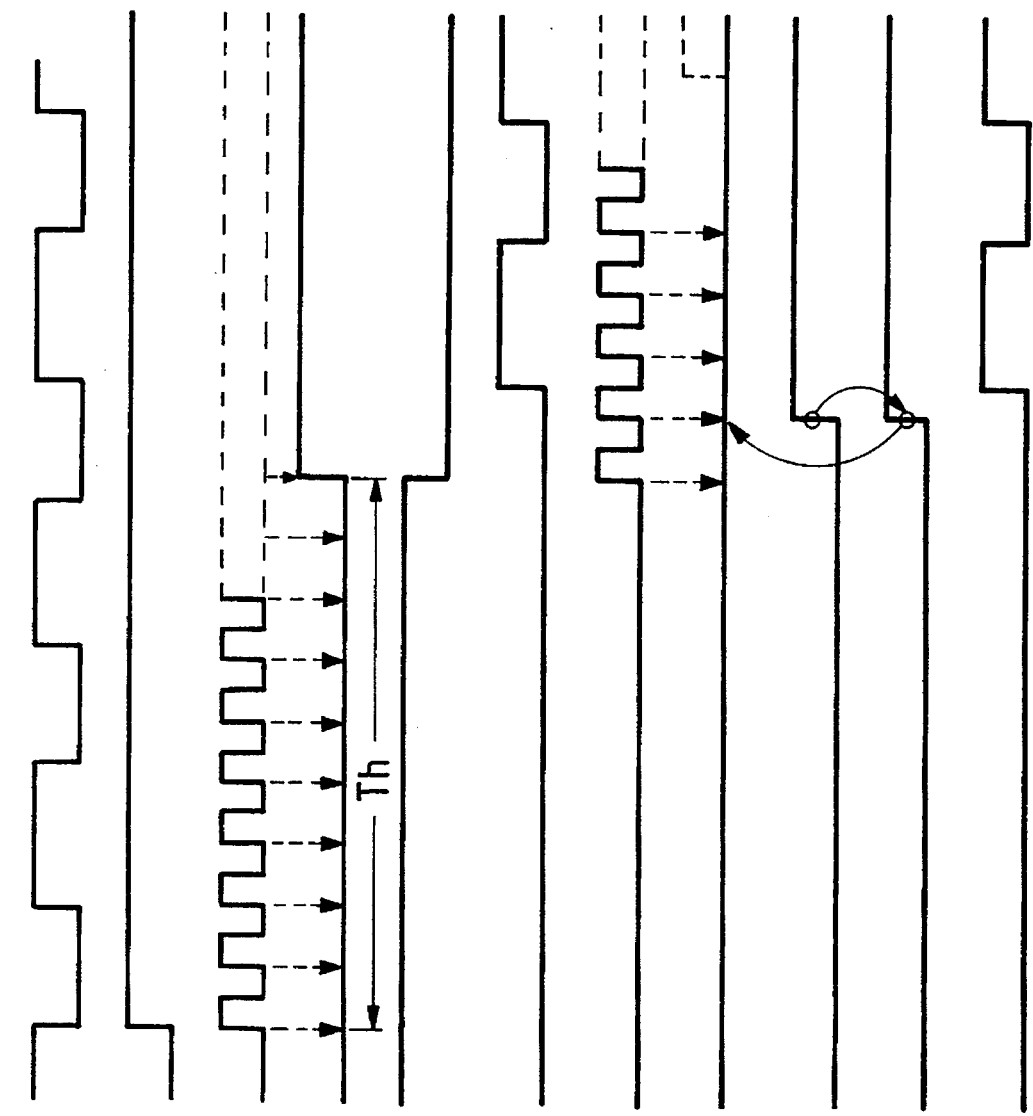

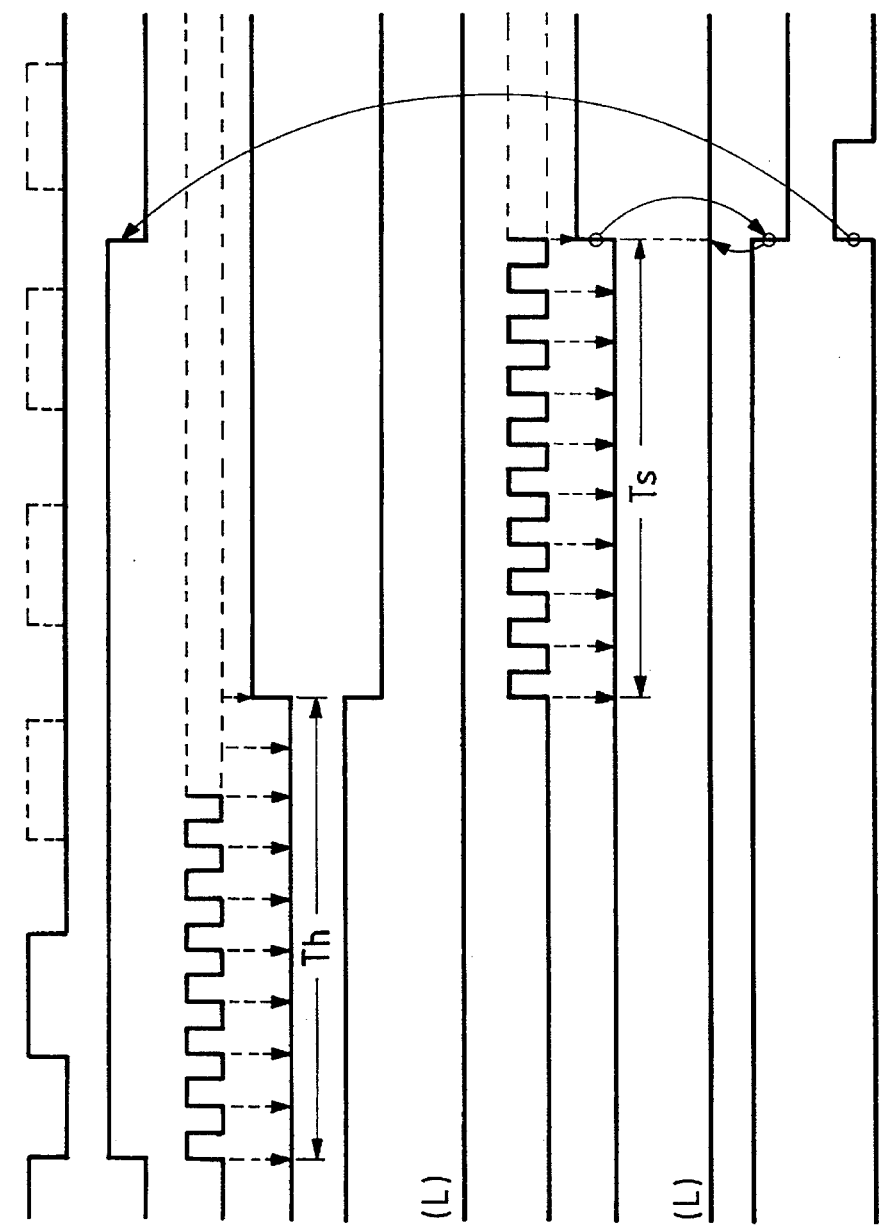

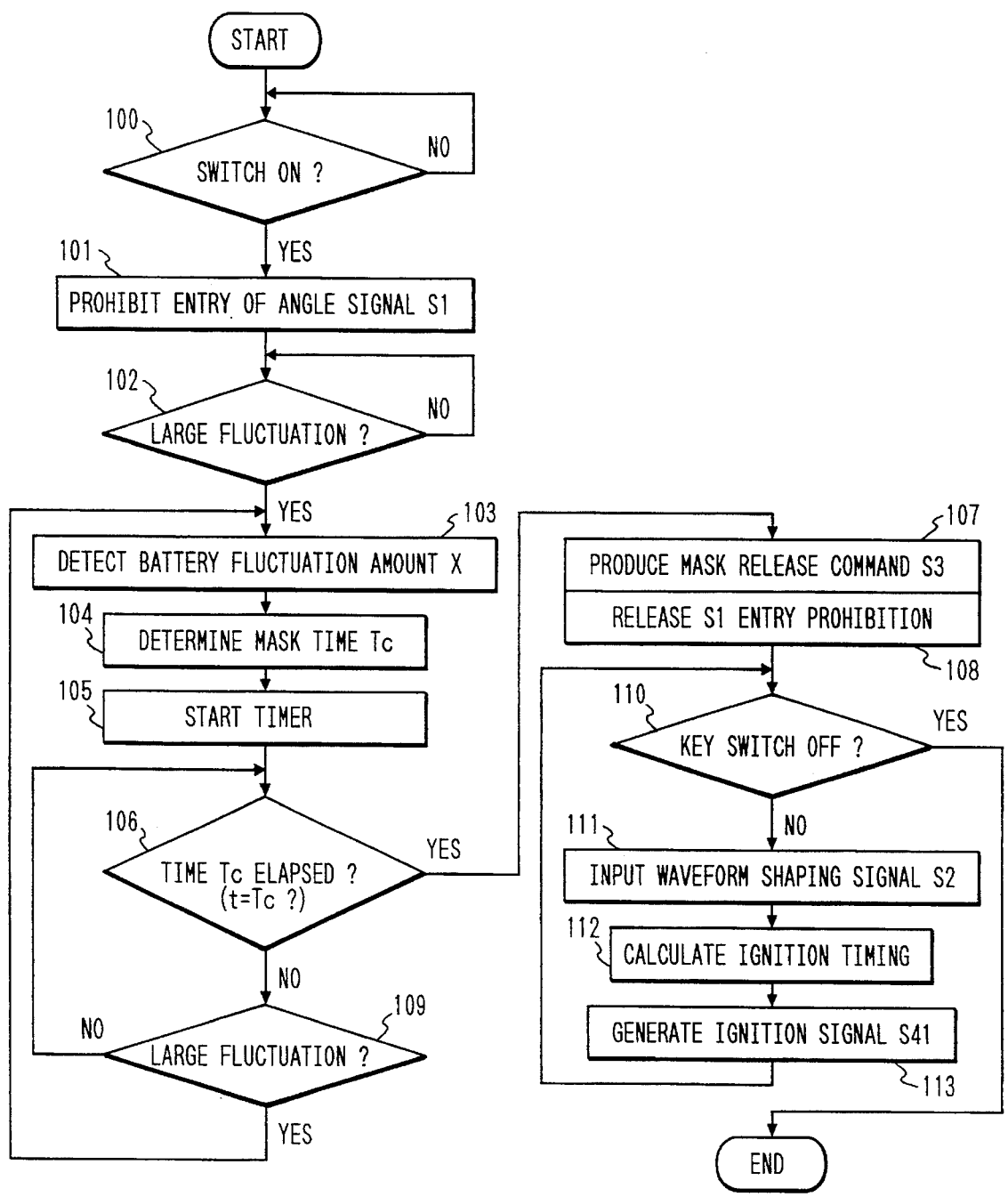

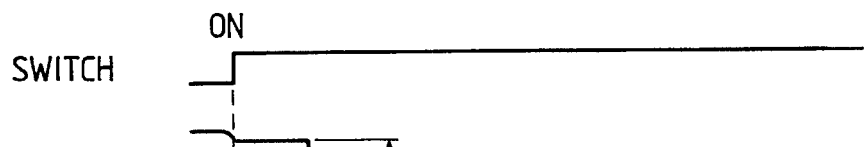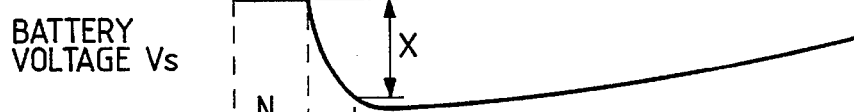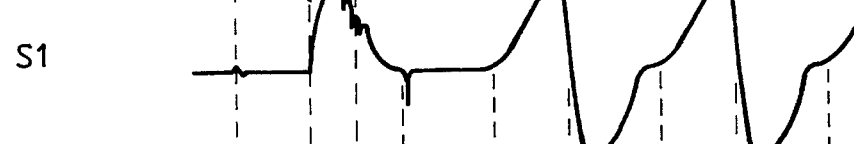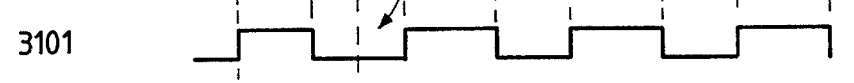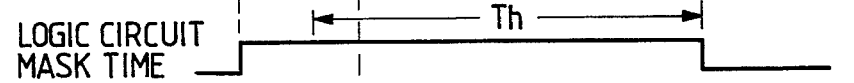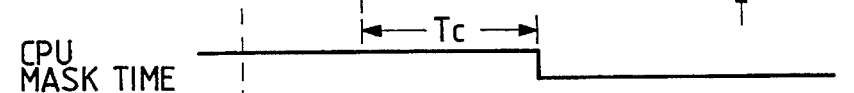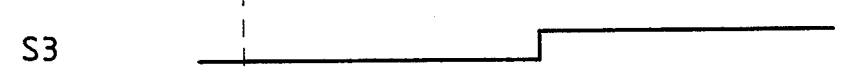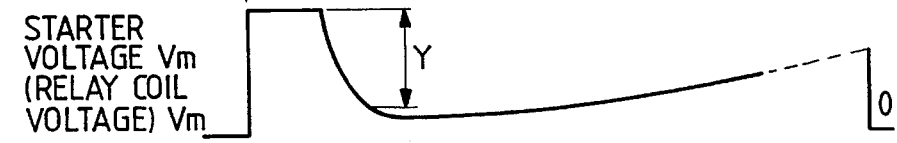

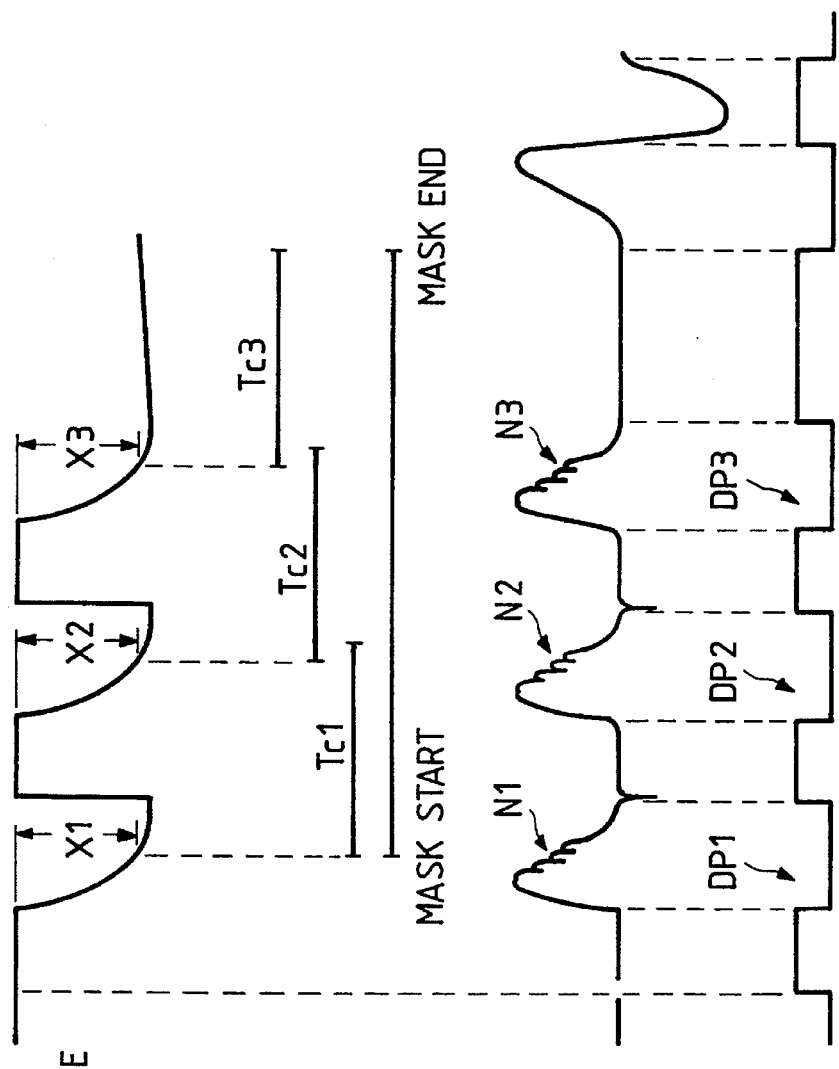

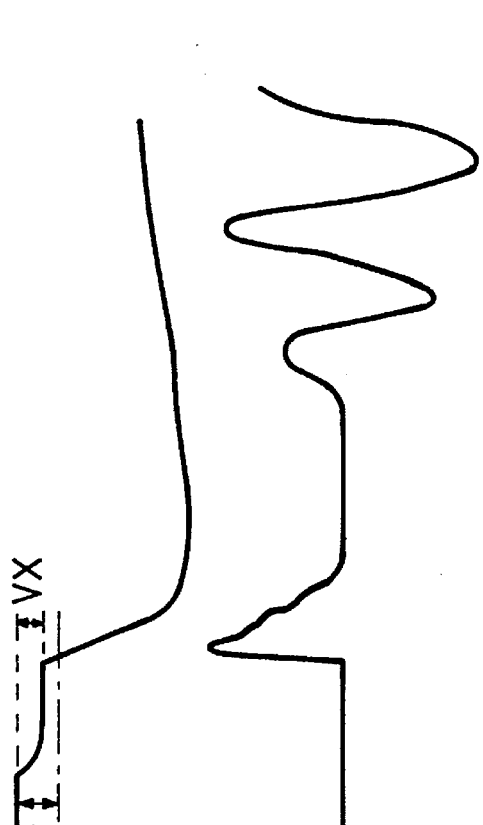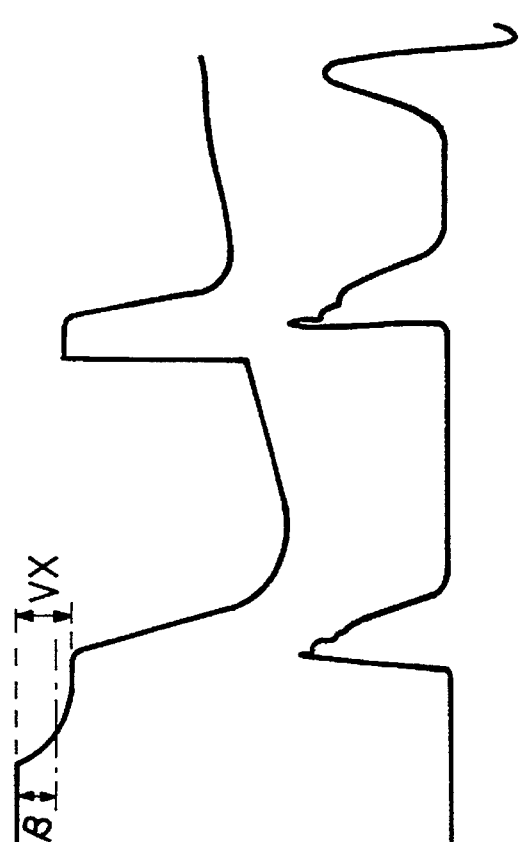
FIG. 15A  BATTERY VOLTAGE Vs (VOLTAGE VARIATION vx)
FIG. 15B  S1 (NO CHATTERING)
FIG. 15C  BATTERY VOLTAGE Vs (VOLTAGE VARIATION vx)
FIG. 15D  S1 (WITH CHATTERING)

FIG. 16A SWITCH 
FIG. 16B BATTERY VOLTAGE Vs (VOLTAGE VARIATION vx) 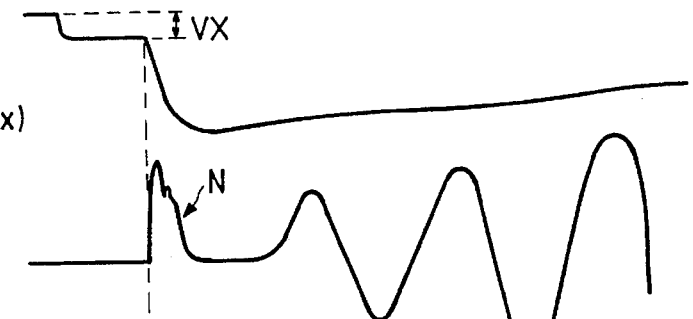
FIG. 16C S1 

FIG. 16E LOGIC CIRCUIT MASK TIME 
FIG. 16F S42(3115) 
FIG. 16G CPU MASK TIME 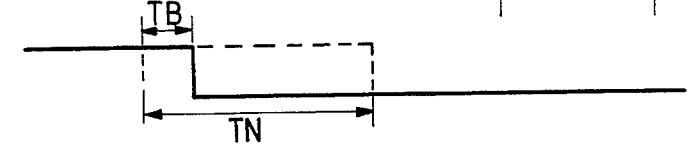
FIG. 16H S3 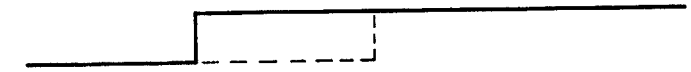
FIG. 16I S41(S2) 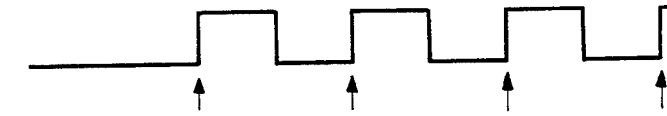

IGNITION TIMING CONTROL APPARATUS FOR AN INTERNAL COMBUSTION ENGINE

BACKGROUND OF THE INVENTION

1. Field of the Invention

The present invention relates to an ignition timing control apparatus for an internal combustion engine, and more particularly to an improvement of an ignition timing control apparatus for prohibiting the ignition operation from being erroneously executed based on the noise added on an angle signal in an engine start-up condition.

2. Prior Art

As conventionally well known, an ignition timing control apparatus generates an ignition signal for actuating an ignition plug on the basis of an angle signal produced by a pickup sensor provided in a confronting relation to a signal rotor rotating in synchronism with a crank shaft of an internal combustion engine.

The signal rotor and the pickup sensor are generally disposed in the vicinity of the starter section of an engine. Thus, at the moment the engine is started up, the battery voltage is so largely fluctuated that electromagnetic noises are added onto the angle signal. Furthermore, the angle signal is further added vibration noises generated when the crank shaft starts rotating. The angle signal containing such noises tends to cause erroneous ignition signal, resulting in a mistaken ignition operation.

To solve this problem, the unexamined Japanese Patent Application No. HEI 4-325776/1992 discloses a technology of neglecting the angle signal for a predetermined time immediately after a voltage is applied to the starter (i.e. relay coil) of an internal combustion engine.

According to this prior art technology, the time required to neglect the angle signal is fairly long. Because, this time must be long enough to cover chattering which may be causes by the starter. This means that meaningless cranking will increase when no chattering is generated by the starter.

The Unexamined Japanese Utility Model Application No. SHO 63-26775/1988 discloses another ignition timing control apparatus which disables the power transistor of the ignition coil when the noise level detected by a noise detecting sensor provided near the electromagnetic pickup is larger than a predetermined value. Or, the power transistor is disabled when the battery voltage causes a large change more than a predetermined value.

According to such a prior art apparatus, it is feared that the ignition operation may be undesirably interrupted even if the angle signal is normal and sufficiently larger than the noise, because the ignition operation will be always prohibited when the noise level or the battery voltage variation exceeds the predetermined value.

SUMMARY OF THE INVENTION

Accordingly, in view of above-described problems encountered in the prior art, a principal object of the present invention is to provide an ignition timing control apparatus for an internal combustion engine capable of accurately masking the angle signal only when erroneous ignition may occur, thereby effectively suppressing meaningless cranking and improving start-up ability of the engine, regardless of occurrence of chattering.

In order to accomplish this and other related objects, a first aspect of the present invention provides an ignition timing control apparatus for an internal combustion engine comprising: a signal rotor rotating in synchronism with a crank shaft of the internal combustion engine; a pickup sensor disposed in a confronting relation to the signal rotor to generate an angle signal proportional to rotation of the internal combustion engine; ignition signal producing means for calculating an ignition timing on the basis of the angle signal and generating an ignition signal for igniting the internal combustion engine; and time mask means for monitoring a parameter representative of a battery voltage, and prohibiting the angle signal from entering into the ignition signal producing means for a predetermined time in response to a detection of a predetermined amount fluctuation of the parameter.

In the above first aspect ignition timing control apparatus for an internal combustion engine, it is preferable that the time mask means varies the predetermined time in accordance with a fluctuation amount of the parameter. Furthermore, it is preferable to provide cooling water temperature detecting means for detecting a cooling water temperature in an engine start-up condition, so that the time mask means can vary the predetermined time in accordance with the cooling water temperature detected by the cooling water temperature detecting means. It is further preferable to provide edge mask means for neglecting at least first arriving edge of the angle signal to be entered to the ignition signal producing means after the predetermined time determined by the time mask means has elapsed.

A second aspect of the present invention provides an ignition timing control apparatus for an internal combustion engine comprising: a signal rotor rotating in synchronism with a crank shaft of the internal combustion engine; a pickup sensor disposed in a confronting relation to the signal rotor to generate an angle signal proportional to rotation of the internal combustion engine; ignition signal producing means for calculating an ignition timing on the basis of the angle signal and generating an ignition signal for igniting the internal combustion engine; noise duration estimating means for monitoring a parameter representative of a battery voltage and, when a variation amount of the parameter is larger than a predetermined value, estimating on the basis of the variation amount a noise duration during which the angle signal is possibly added noises; a mask time memory for storing a plurality of mask times selectable in accordance with an estimated noise duration; and mask control means for selecting an optimum mask time among the mask times stored in the mask time memory in accordance with the estimated noise duration, and prohibiting the angle signal from entering into the ignition signal producing means for a selected mask time in response to a detection of a predetermined amount variation of the parameter.

In the above second aspect ignition timing control apparatus for an internal combustion engine, it is preferable that the noise duration estimating means estimates occurrence of chattering noises added to the angle signal in accordance with the variation amount of the parameter; the mask time memory comprises a first mask time corresponding to a chattering condition and a second mask time corresponding to a non-chattering condition; and the mask control means selects the first mask time when occurrence of chattering noises is estimated by the noise duration estimating means, while the mask control means selects the second mask time when occurrence of chattering noises is not estimated by the noise duration estimating means. It is further preferable to provide edge mask means for neglecting at least first arriving edge of the angle signal to be entered to the ignition signal producing means after the predetermined time selected by the mask means has elapsed.

A third aspect of the present invention provides an ignition timing control apparatus for an internal combustion engine comprising: a signal rotor rotating in synchronism with a crank shaft of the internal combustion engine; a pickup sensor disposed in a confronting relation to the signal rotor to generate an angle signal proportional to rotation of the internal combustion engine; first ignition signal producing means, operated by a software program, for calculating an ignition timing on the basis of the angle signal and generating a first ignition signal for igniting the internal combustion engine; first time mask means for monitoring a parameter representative of a battery voltage, and prohibiting the angle signal from entering into the first ignition signal producing means for a first predetermined time in response to a detection of a predetermined amount fluctuation of the parameter; second ignition signal producing means, constituted by hardware components, for generating a second ignition signal for igniting the internal combustion engine; second time mask means for prohibiting the angle signal from entering into the second ignition signal producing means for a second predetermined time in response to a first change of the angle signal in an engine start-up condition, the second predetermined time being longer than the first predetermined time; and mask release means for, when either one of the first and second predetermined times has elapsed, releasing prohibition of entry of the angle signal into the ignition signal producing means corresponding to the either one of the first and second predetermined times.

In the above third aspect ignition timing control apparatus for an internal combustion engine, it is preferable that the first time mask means varies the first predetermined time in accordance with a fluctuation amount of the parameter. It is further preferable to provide cooling water temperature detecting means for detecting a cooling water temperature in an engine start-up condition, so that at least one of the first and second time mask means can vary the corresponding predetermined time in accordance with the cooling water temperature detected by the cooling water temperature detecting means. It is preferable to provide edge mask means for neglecting at least first arriving edge of the angle signal to be entered to the first ignition signal producing means, after the first predetermined time determined by the first time mask means has elapsed. Furthermore, it is preferable to provide first time mask means for prohibiting the angle signal from entering into the second ignition signal generating means for the second predetermined time in response to a first change of next arriving angle signal when the angle signal is terminated during a third predetermined time after the second predetermined time has elapsed. It is further preferable to provide output control means for selectively outputting one of the first and second ignition signals when the one arrives earlier than the other, and neglecting the other.

Moreover, a fourth aspect of the present invention provides an ignition timing control apparatus for an internal combustion engine comprising: a signal rotor rotating in synchronism with a crank shaft of the internal combustion engine; a pickup sensor disposed in a confronting relation to the signal rotor to generate an angle signal proportional to rotation of the internal combustion engine; first ignition signal producing means, operated by a software program, for calculating an ignition timing on the basis of the angle signal and generating a first ignition signal for igniting the internal combustion engine; noise duration estimating means for monitoring a parameter representative of a battery voltage and, when a variation amount of the parameter is larger than a predetermined value, estimating on the basis of the variation amount a noise duration during which the angle signal is possibly added noises; a mask time memory for storing a plurality of mask times selectable in accordance with an estimated noise duration; mask control means for selecting an optimum mask time among the mask times stored in the mask time memory in accordance with the estimated noise duration, and prohibiting the angle signal from entering into the first ignition signal producing means for a selected mask time in response to a detection of a predetermined amount variation of the parameter; second ignition signal producing means, constituted by hardware components, for generating a second ignition signal for igniting the internal combustion engine; time mask means for prohibiting the angle signal from entering into the second ignition signal producing means for a predetermined time in response to a first change of the angle signal in an engine start-up condition, the predetermined time being longer than the selected mask time; and mask release means for, when either one of the selected mask time and the predetermined time has elapsed, releasing prohibition of entry of the angle signal into the ignition signal producing means corresponding to the either one of the selected mask time and the predetermined time.

In the above fourth aspect ignition timing control apparatus for an internal combustion engine, it is preferable that the noise duration estimating means estimates occurrence of chattering noises added to the angle signal in accordance with the variation amount of the parameter; the mask time memory comprises a first mask time corresponding to a chattering condition and a second mask time corresponding to a non-chattering condition; and the mask control means selects the first mask time when occurrence of chattering noises is estimated by the noise duration estimating means, while the mask control means selects the second mask time when occurrence of chattering noises is not estimated by the noise duration estimating means.

BRIEF DESCRIPTION OF THE DRAWINGS

The above and other objects, features and advantages of the present invention will become more apparent from the following detailed description which is to be read in conjunction with the accompanying drawings, in which:

FIGS. 2A–2G are time charts showing operation of the logic circuit section of the first embodiment apparatus, in the case that the mask release command is generated from the CPU;

FIGS. 3A–3K are time charts showing operation of the logic circuit section of the first embodiment apparatus, in the case that the mask release command is generated from the logic circuit section;

FIGS. 4A–4K are time charts showing operation of the logic circuit section of the first embodiment apparatus, in the case that the angle signal is terminated;

FIG. 5 is a flowchart showing the processing procedure of the CPU in accordance with the first embodiment apparatus;

FIGS. 8A–8J are time charts showing the ignition timing control operation of the first embodiment apparatus;

FIGS. 9A–9E are time charts showing the ignition timing control operation of the first embodiment apparatus, in the event that the chattering is generated;

FIGS. 15A–15D are time charts showing variations of the battery voltage; and FIGS. 16A–16I are time charts showing the ignition timing control operation of the third embodiment apparatus.

DETAILED DESCRIPTION OF THE PREFERRED EMBODIMENTS

Preferred embodiments of the electromagnetic valve in accordance with the present invention will be explained in greater detail hereinafter, with reference to the accompanying drawings.

First Embodiment

Figure 1:
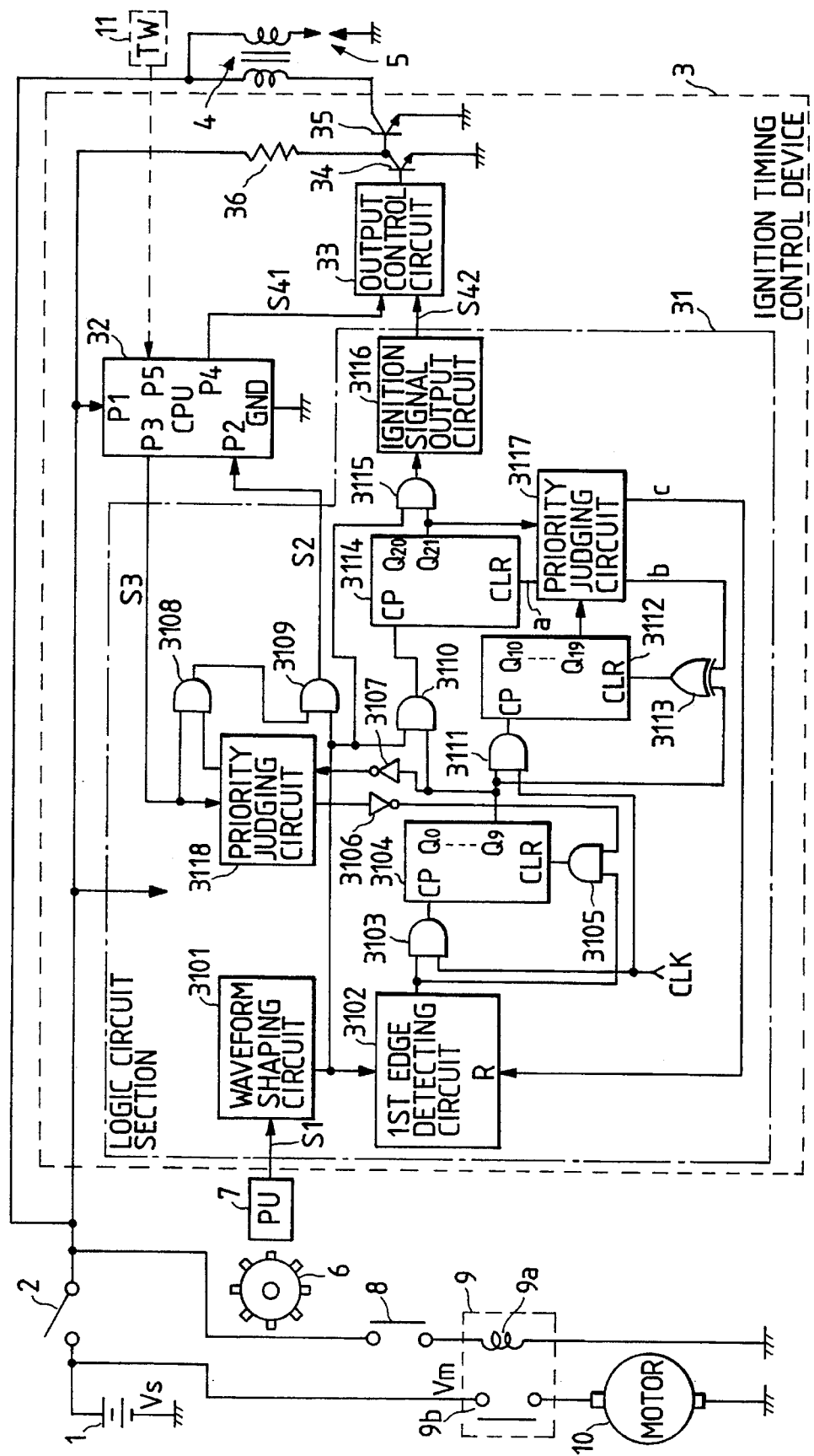
FIG. 1 is a block diagram showing an ignition timing control apparatus for an internal combustion engine in accordance with the first embodiment of the present invention.

FIG. 1 shows a circuit diagram of an ignition timing control apparatus in accordance with the first embodiment of the present invention.

A battery 1, housed in an engine room of an automotive vehicle, has a rating output Vs of approximately 12 volts. When a key switch 2 is closed, the battery 1 supplies its output voltage Vs to an ignition timing control device 3. The ignition timing control device 3 chiefly comprises a logic circuit section 31, a CPU (i.e. central processing unit) 32, an output control circuit 33, a drive transistor 34, a power transistor 35, and a resistor 36.

Each of the logic circuit section 31 and the CPU 32 has a function of masking an angle signal later described and producing an ignition signal on the basis of this angle signal. Namely, the CPU 32 produces an ignition signal S41 while the logic circuit section 31 produces an ignition signal S42. These ignition signals S41 and S42 are respectively supplied to the output control circuit 33 and, then, selectively supplied to the base terminal of the drive transistor 34 to turn on the same.

The ignition signal S41 and S42 are seldom produced simultaneously. However, in the event that these ignition signals S41 and S42 happen to be generated at a time, the output control circuit 33, monitoring output timings of these ignition signals S41 and S42, gives a priority to either one of these two signals S41 and S42.

The power transistor 35 has a collector electrode connected via an ignition coil 4 to an ignition plug 5.

When the power transistor 35 is turned off, the primary current of the ignition coil 4 is terminated and a high voltage is generated at the secondary side. This high voltage actuates the ignition plug 5 to cause a spark. Namely, each time the ignition signal S41 or S42 becomes ON (i.e. H level), i.e. each time the power transistor 35 is turned off, the engine is ignited.

Near an engine crank shaft (not shown), there is provided a signal rotor 6 rotating in synchronism with the crank shaft, and a pickup sensor 7 disposed in a confronting relation to the signal rotor 6 to generate an angle signal S1 proportional to rotation of the engine. The angle signal S1 is supplied to the ignition timing control device 3 and converted into the above-described ignition signal S41 or S42.

In the vicinity of the signal rotor 6 and the pickup sensor 7, there is disposed a starter section comprising the starter switch 8, the starter relay 9 and the starter motor 10. When the starter switch 8 is closed under the condition that the key switch 2 is closed, a relay coil 9a of the starter relay 9 is activated to close a relay contact 9b of the starter relay 9. Upon closing of the relay contact 9b, the output voltage Vs of the battery 1 is supplied to the starter motor 10, thereby starting up the engine.

As soon as the engine starts rotating, the pickup sensor 7 generates the angle signal S1 which is synchronous with the rotation of the engine. However, in this engine start-up operation, the output voltage Vs of the battery 1 tends to cause large fluctuation. Such fluctuation induces noises added to the angle signal S1.

The logic circuit section 31 and the CPU 32, cooperatively constituting the ignition timing control device 3, respectively have a function of masking the angle signal S1 during a duration that such noises appear on the angle signal S1.

Hereinafter, the arrangement and function of the logic circuit section 31 and the CPU 32 for masking the angle signal S1 will be explained with reference to FIGS. 2 through 7.

The logic circuit section 31 comprises a waveform shaping circuit 3101 through which the waveform of the angle signal S1 is converted into a rectangular shape. The signal thus waveform shaped is added to each of a first edge detecting circuit 3102, an AND circuit 3109, an AND circuit 3110, and an AND circuit 3115.

The first edge detecting circuit 3102 produces an L-level signal as initial value, and produces an H-level signal when it detects the first edge (i.e. signal level change) of the waveform shaping signal of the angle signal S1. Thereafter, the first edge detecting circuit 3102 maintains the H-level output signal until a reset signal is input to its reset terminal R.

By outputting an H-level signal from the first edge detecting circuit 3102, the AND circuit 3103 is opened and therefore a clock signal CLK is applied to the terminal CP of a counter 3104.

The counter 3104 starts the counting-up operation in response to the clock signal CLK applied to the terminal CP under the activated condition where its CLR terminal is in an H level (i.e. a clear released condition). When the count value is incremented from the initial value Q0 to a predetermined value Q9 corresponding to a time elapse Th, the counter 3104 changes its output signal from L level to H level.

When a mask release command S3 is not generated from the CPU 32, i.e when the signal S3 is in an L level, an inverter 3106 gives an inverse signal (i.e. an H-level signal) to an AND circuit 3105. Accordingly, when the mask release command S3 is generated after the counter 3104 counted up the predetermined value Q9, the counter 3104 produces the H-level signal. On the other hand, when the mask release command S3 is generated before the counter 3104 counts up the predetermined value Q9, the counter 3104 is cleared and its output is maintained at an L level.

An inverter 3107 inverts an output of the counter 3104. Thus, the inverter 3107 generates an H-level signal when the counter 3104 outputs an L-level signal, and generates an L-level signal when the counter 3104 outputs an H-level signal.

A priority judging circuit 3118 monitors an output of the inverter 3107 and the mask release command S3. The passage of signals in this priority judging circuit 3118 is controlled in such a manner that only one of these two signals, which changes its level prior to the other, is allowed to pass through the priority judging circuit 3118 while the other one is neglected.

For this reason, the priority judging circuit 3118 has initial input and output values of L level at the inverter 3106 side and has initial input and output values of H level at the other inverter 3107 side. When the counter 3104 counted up the predetermined value Q9 before the CPU 32 outputs the mask release command S3, only the input and output of the inverter 3107 side are inverted to the L level in the priority judging circuit 3118, while the input and output of the inverter 3106 side are maintained at the L level. This means that both AND circuits 3108 and 3109 are maintained in the closed (i.e. deactivated) condition. On the contrary, when the CPU 32 outputs the mask release command S3 before the counter 3104 counts up the predetermined value Q9, only the input and output of the inverter 3106 side are inverted to the H level in the priority judging circuit 3118, while the input and output of the inverter 3107 side are maintained at the H level. This means that both AND circuits 3108 and 3109 are maintained in the open (i.e. activated) condition.

FIGS. 2A–2G are time charts showing operation of the logic circuit section 31 in the case that the CPU 32 outputs the mask release command S3 before the counter 3104 counts up the predetermined value Q9. FIG. 2A shows an output of the waveform shaping circuit 3101; FIG. 2B shows an output of the first edge detecting circuit 3102; FIG. 2C shows an output of the AND circuit 3103; and FIG. 2D shows an output of the counter 3104. When the CPU 32 outputs the mask release command S3 as shown in FIG. 2E, the output of the inverter 3106 is inverted to the L level (FIG. 2F). The counter 3104 is cleared in response to this output change. For this reason, even if time Th corresponding to the predetermined value Q9 has elapsed, the output of the counter 3104 is maintained at the L level as shown in FIG. 2D. Thus, the AND circuit 3109 outputs the waveform shaped signal of the angle signal S1 in response to the output of the mask release command S3 as shown in FIG. 2G. This waveform shaped signal is taken into the CPU 32 as a signal S2.

On the other hand, in the logic circuit section 31, both AND circuits 3110 and 3111 are opened (activated) provided that the mask release command S3 is not generated from the CPU 32 before the output of the counter 3104 is inverted to the H level, i.e. before time Th has elapsed. In response to opening of these AND circuits 3110 and 3111, the waveform shaped signal of the angle signal S1 is input to a counter 3114. Meanwhile, the clock signal CLK is input to a counter 3112.

The counter 3112, like the counter 3104, starts the counting-up operation in response to the clock signal CLK applied to the terminal CP under the activated condition where its CLR terminal is in the H level. When the count value increases from the initial value Q10 to a predetermined value Q19 corresponding to a time elapse Ts, the counter 3112 changes its output signal from the L level to the H level.

The counter 3114 is activated when its CLR terminal is in H level. A signal applied to the CLR terminal has an initial value of H level. The counter 3114 starts the counting-up operation in response to the waveform shaped signal of the angle signal S1 applied to the terminal CP. This counter 3114 is characterized in that its output changes from the L level to the H level once the above waveform shaped signal is input to the terminal CP.

These counters 3112 and 3114 generate output signals which are respectively supplied to a priority judging circuit 3117. The priority judging circuit 3117 compares these output signals in their inversion timing.

The priority judging circuit 3117 maintains, in its initial condition, its output "a" at the H level, its output "b" at the L level, and its output "c" at the L level. Meanwhile, the priority judging circuit 3117 changes its outputs "a", "b" and "c" in accordance with inversion order of the outputs produced by the counters 3112 and 3114, in the following manner.

(1) When the counter 3114 is earlier than the counter 3112 in the change of their output level, i.e. when the waveform shaped signal of the angle signal S1 is input to the counter 3114 before time Ts has elapsed, the priority judging circuit 3117 maintains the output "a" at the H level and the output "c" at the L level but changes the output "b" from the L level to the H level.

(2) When the counter 3112 is earlier than the counter 3114 in the change of their output level, i.e. when input of the waveform shaped signal of the angle signal S1 into the counter 3114 is terminated during the elapse of the time Ts, the priority judging circuit 3117 maintains the output "b" at the H level but changes the output "a" from the H level to the L level. And, the priority judging circuit 3117 generates the output signal "c" serving as a reset signal supplied to the first edge detecting circuit 3102. Namely, the output signal "c" temporarily changes from the L level to the H level.

FIGS. 3A–3K are time charts showing operation of the logic circuit section 31 in accordance with the above switching operation (1). FIGS. 4A–4K are time charts showing operation of the logic circuit section 31 in accordance with the above switching operation (2). Operation and function of the logic circuit section 31 will be further explained with reference to FIGS. 3A–3K and 4A–4K, in the case that time Th has elapsed before the CPU 32 outputs the mask release command S3.

First of all, FIG. 3A shows an output of the waveform shaping circuit 3101; FIG. 3B shows an output of the first edge detecting circuit 3102; FIG. 3C shows an output of the AND circuit 3103; and FIG. 3D shows an output of the counter 3104. When the time Th has elapsed before the CPU 32 outputs the mask release command S3, the counter 3104 outputs an H-level signal as shown in FIG. 3D. At the same time, the output of the inverter 3107 is inverted to the L level. In response to inversion of the output of inverter 3107, both the AND circuit 3108 and 3109 are closed, thus prohibiting the signal S2 from being supplied to the CPU 32.

When the output of the counter 3104 is inverted to the H level, both the AND circuit 3110 and 3111 are opened. Accordingly, the AND circuit 3110 produces the waveform shaping signal of the angle signal S1 as shown in FIG. 3F. Meanwhile, the AND circuit 3111 produces the clock signal CLK as shown in FIG. 3G.

When the waveform shaped signal of the angle signal S1 is input to the counter 3114 before the time Ts has elapsed, the output of the counter 3114 is inverted to the H level as shown in FIG. 3I while the output "b" of the priority judging circuit 3117 is switched to the H level as shown in FIG. 3J. Thus, an exclusive OR circuit 3113 generates an output of L level, and the counter 3112 is cleared. That is, the output of the counter 3112 is maintained at the L level as shown in FIG. 3H. When the output of the counter 3114 is inverted to the H level, the AND circuit 3115 is opened. Thus, the AND circuit 3115 generates the waveform shaping signal of the angle signal S1 as shown in FIG. 3K. The output signal of the AND circuit 3115 is given to an ignition signal output circuit 3116 where the output signal is converted into the ignition signal S42 which is supplied to the output control circuit 33. More specifically, the ignition signal output circuit 3116 detects the reference position based on the angle signal S1 and generates the ignition signal S42 taking account of the reference position. Otherwise, the ignition signal output circuit 3116 generates the ignition signal S42 based on the angle signal S1.

On the contrary, the operating condition illustrated by FIGS. 4A–4K corresponds to the case where the angle signal S1 (i.e. its waveform shaped signal) is once generated but later terminated for some reasons as shown in FIG. 4A, or the case the initial pulse of the angle signal S1 is merely noise and therefore the angle signal S1 is not actually generated in accordance with the actual rotation of the engine.

FIG. 4A shows an output of the waveform shaping circuit 3101; FIG. 4B shows an output of the first edge detecting circuit 3102; FIG. 4C shows an output of the AND circuit 3103; and FIG. 4D shows an output of the counter 3104. When the time Th has elapsed before the CPU 32 outputs the mask release command S3, the counter 3104 outputs an H-level signal as shown in FIG. 4D. At the same time, the output of the inverter 3107 is inverted to the L level as shown in FIG. 4E. This inversion prohibits the signal S2 from being supplied to the CPU 32.

When the angle signal S1 (i.e. the waveform shaping signal) is terminated as shown in FIG. 4A, both the AND circuits 3110 and 3111 are opened in response to the output of the counter 3104. However, the AND circuit 3110 maintains its output at the L level as shown in FIG. 4F. For this reason, the counter 3114 does not start the counting operation. The counter 3112 solely starts the counting operation on the basis of the clock signal CLK shown in FIG. 4G. The counter 3112 changes its output to the H level at the time a predetermined counting corresponding to the time Ts is completed as shown in FIG. 4H.

Thus, when the counter 3112 has inverted its output level prior to the counter 3114, the output "a" of the priority judging circuit 3117 is inverted to the L level as shown in FIG. 4J. Meanwhile, the counter 3114 is maintained at cleared condition as shown in FIG. 4I. Accordingly, the AND circuit 3115 is maintained at the closed condition. And, input of the angle signal (i.e. the waveform shaping signal) into the ignition signal output circuit 3116 is prohibited.

In this manner, when the counter 3112 has inverted its output level prior to the counter 3114, the priority judging circuit 3117 generates the output "c" serving as a reset signal supplied to the first edge detecting circuit 3102 as shown in FIG. 4K. Hence, all the circuits are initialized in the logic circuit section 31.

When the angle signal S1 is again generated after the passage of the time Ts, the logic circuit section 31 itself, including the first edge detecting circuit 3102, restarts its operation.

In short, the logic circuit section 31 has a variety of functions of:

(A) shaping the waveform of the angle signal S1;

(B) starting the masking operation of the angle signal S1 upon staring up of the engine, and releasing the masking operation after the time Th has elapsed since the detection of the first change of the angle signal S1;

(C) generating the ignition signal in the case that the logic circuit section 31 itself terminates the masking operation after the passage of time Th;

(D) resuming the masking operation, when the angle signal S1 is not input during time Ts after the passage of the time Th, during the time Th from the detection of the first change of next arriving angle signal S1; and (E) supplying the CPU 32 with the waveform shaping signal of the angle signal S1 as the signal S2 in the event that the CPU 32 has generated the mask release command S3 before the time Th has elapsed, instead of producing the ignition signal by itself.

The CPU 32 executes the processing shown in the flowchart of FIG. 5, which is memorized in a built-in memory or a detachable memory of the CPU 32.

Next, operation and function of the CPU 32, acting as another ignition signal generating means constituting the ignition timing control device 3, will be explained with reference to FIG. 5.

The CPU 32 has a port P1 connected through the key switch 2 to the battery 1, a port P2 connected to the AND circuit 3109 of the logic circuit section 31, a port P3 connected to the priority judging circuit 3118 of the logic circuit section 31 and an input terminal of the ND circuit 3108, and a port P4 through which the CPU 32 generates the ignition signal S41 to the output control circuit 33.

Figure 6A:
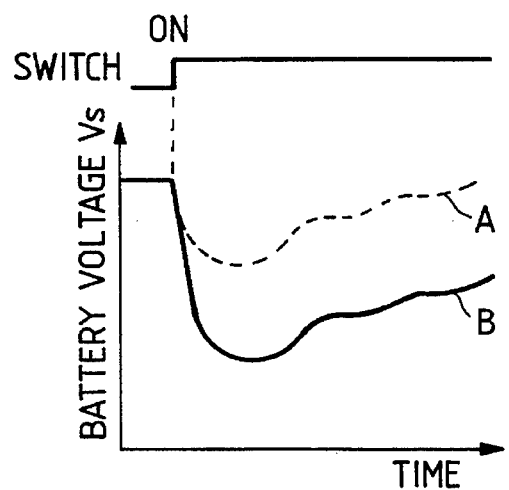
FIGS. 6A and 6B are time charts showing variations of battery voltage in the engine start-up operation.
Figure 6B:
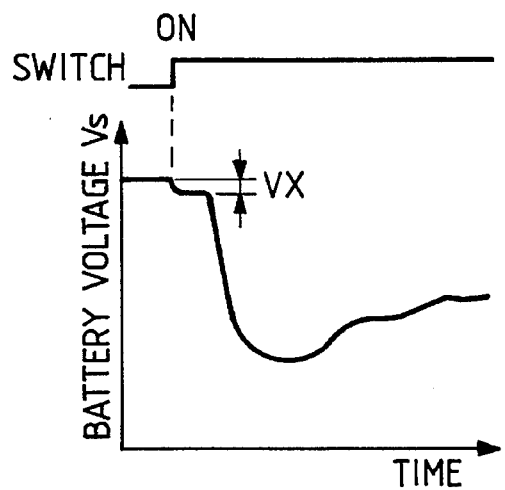
Figure 10:
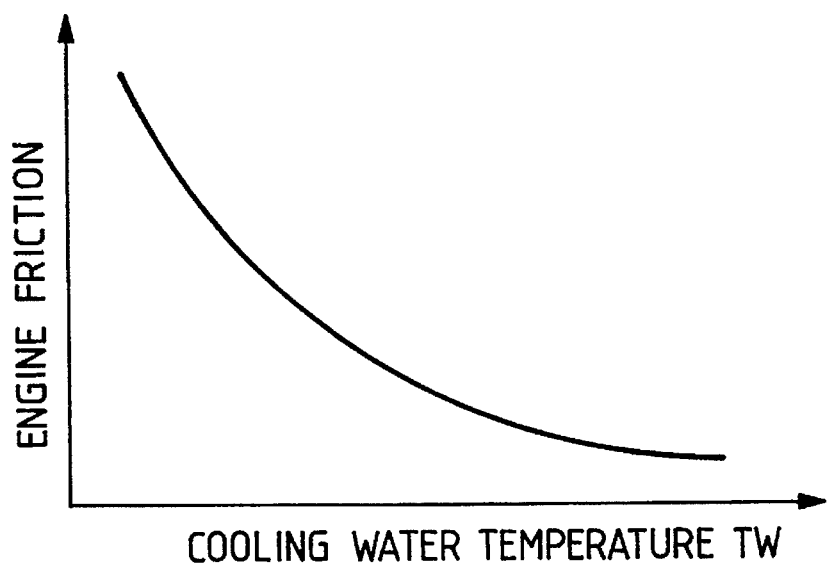
FIG. 10 is a map showing the relationship between the cooling water temperature TW and the engine friction.

As shown in the flowchart of FIG. 5, the CPU 32 makes a judgement in a step 100 as to whether the key switch 2 and the starter switch 8 are turned on or the electric power unit is turned on. This step 100 is repeated until the judgement result turns to "YES". If the judgement is "YES" in the step 100, the CPU 32 proceeds to a step 101 to prohibit the port P2 from inputting the angle signal (i.e. the waveform shaping signal S2). Then, the CPU 32 makes a judgement in a step 102 as to whether the battery voltage Vs causes a fluctuation larger than a predetermined value. This step 102 is repeated until the judgement result turns to "YES". If the judgement is "YES" in the step 102, the CPU 32 proceeds to a step 103 to detect a fluctuation amount X of the battery voltage Vs. The battery voltage Vs generally causes a large variation in response to the actuation of the starter section as shown in FIG. 6A. The degree of variation is generally dependent on the temperature. More specifically, when the temperature is low, the viscous coefficient of engine oil is increased. Thus, engine friction increases with lowering temperature as shown in FIG. 10. Accordingly, an increased load is applied to the starter section in the engine start-up operation. In other words, a large electric current is required. For this reason, when the temperature is low, the battery voltage Vs is largely reduced as indicated by a solid line B in FIG. 6A. Thus, the start-up of the engine is delayed, resulting in vibration noises whose generation timing is delayed. Furthermore, the large load acting on the starter section in the low-temperature condition is likely to cause chattering in the starter section, because an electric current flowing through the starter coil 9a is insufficient due to the large load. This chattering phenomenon is also the cause of delay of noise generation. By the way, a dotted line A of FIG. 6A shows the fluctuation of the battery voltage Vs in the normal temperature. FIG. 6B shows a tiny voltage variation (i.e. reduction) vx of the battery voltage Vs found in a duration from the turning-on operation of switch to the initiation of cranking. This tiny voltage reduction vx can be utilized as a fluctuation of the battery voltage Vs to be detected.

Figure 7:
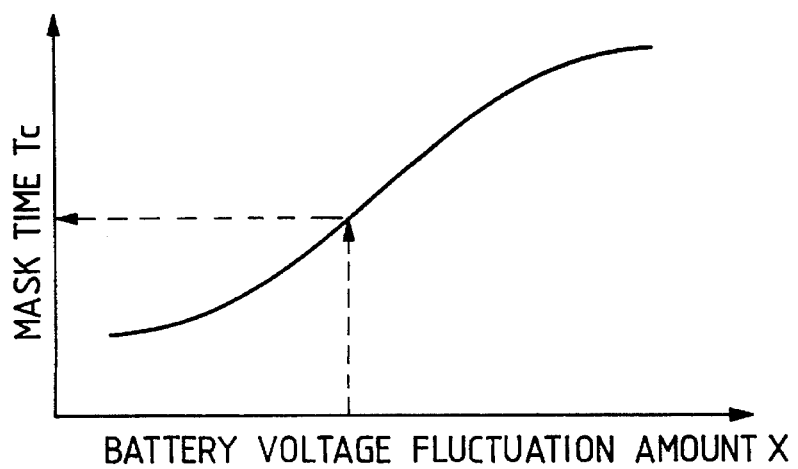
FIG. 7 is a map determining the relationship between the battery voltage fluctuation amount and the mask time Tc.

Taking account of the fluctuation amount X of the battery voltage Vs thus detected, the CPU 32 determines a mask time Tc in a step 104. The mask time Tc is an optimum time required to mask the noises caused by the fluctuation of the battery voltage Vs. FIG. 7 specifically shows a map used for determining the mask time Tc with reference to the battery voltage fluctuation X.

Based on the mask time Tc thus determined, the CPU 32 starts the mask processing in a step 105. More specifically, the CPU 32 resets the time information t of a timer (i.e. t=0) and starts the operation of timer for measuring the mask time Tc.

Using the time information t of the mask time Tc measuring timer, the CPU 32 makes a judgement in a step 106 as to whether the mask time Tc has elapsed or not. If the judgement is "NO" in the step 106, the CPU 32 proceeds to a step 109 to further make a judgement as to whether the battery voltage Vs causes a fluctuation larger than the predetermined value. In short, the CPU 32 continuously monitors the fluctuation of the battery voltage Vs until the mask time Tc has elapsed completely. If the judgement is "YES" in the step 109, the CPU 32 returns to the step 103 to detect the new fluctuation amount X and then proceeds to the step 104 to renew the mask time Tc, and thereafter restarts the mask processing in the step 105. Thus, the steps 103–105 are repeated every time the battery voltage Vs causes the fluctuation more than the predetermined value. If the judgement is "NO" in the step 109, the CPU 32 returns to the step 106.

When the judgement is "YES" in the step 106, the CPU 32 proceeds to a step 107 to generate the mask release command S3 from the port P3 to the logic circuit section 31. The generation of the mask release command S3 has a function of releasing the command of prohibiting the angle signal (i.e. the waveform shaping signal S2) from entering into the port P2. (Step 108) Thus, the waveform shaping signal S2 of the angle signal S1 is allowed to enter from the logic circuit section 31 to the port P2.

Next, the CPU 32 makes a judgement in a step 110 as to whether the key switch 2 is turned off or not. If the key switch 2 is turned on, the CPU 32 proceeds to a step 111 to input the waveform shaping signal S2. Subsequently, the CPU 32 calculates the ignition timing on the basis of the change timing of the waveform shaping signal S2 (Step 112) and generates the ignition signal S41 which is output through the port P4 to the output control circuit 33 (Step 113). Meanwhile, if the key switch 2 is turned off, the CPU 32 ends the processing of this routine.

FIGS. 8A–8J are time charts showing operation of the first embodiment apparatus.

When the key switch 2 and the starter switch 8 are both turned on as illustrated in FIG. 8A, the relay coil 9a of the starter relay 9 is energized to close the relay contact 9b. Upon closing of the relay contact 9b, the output voltage Vs of the battery 1 is applied to the starter motor 10, thereby starting up the engine.

After the engine starts rotating, the pickup sensor 7 generates the angle signal S1 in synchronism with rotation of the engine. In an engine start-up operation, the voltage Vs of the battery 1 causes a large fluctuation as shown in FIG. 8B. Such a fluctuation adds the noise N onto the angle signal S1, as shown in FIG. 8C. When the noise N is added to the angle signal S1, an erroneous detection pulse DP appears on the waveform shaping signal produced from the waveform shaping circuit 3101, as shown in FIG. 8D. In general, this kind of erroneous detection pulse DP induces an erroneous ignition signal which makes the engine ignite mistakenly.

Thus, the first embodiment apparatus prohibits the generation of ignition signal in response to such an erroneous detection pulse DP, effecting the above-described masking processing using either the logic circuit section 31 or the CPU 32.

Namely, as described as the function (B), the logic circuit section 31 sets the mask time (Th+α) shown in FIG. 8E for masking the waveform shaping signal of the angle signal S1 shown in FIG. 8D. The time α corresponds to a time duration from the turning-on of the key switch 2 and the starter switch 8 to the detection of the first edge of the waveform shaping signal.

On the other hand, the CPU 32 sets the mask time Tc shown in FIG. 8G based on the fluctuation amount X of the battery voltage Vs shown in FIG. 8B for masking the waveform shaping signal of the angle signal S1 shown in FIG. 8D. The mask time Tc is determined to be sufficient to surely mask the erroneous detection pulse DP. Furthermore, in this embodiment, the mask time Tc determined by the CPU 32 has the following relationship to the mask time Th determined by the logic circuit section 31.

$$Tc < Th \tag{1}$$

Accordingly, if the battery voltage Vs is not later encountered with the fluctuation exceeding the predetermined value, the CPU 32 generates the mask release command S3 shown in FIG. 8H after the mask time Tc has elapsed since it is set by the CPU 32 at the time the key switch 2 and the starter switch 8 are both turned on.

In response to the mask release command S3 generated from the CPU 32, the logic circuit section 31 releases the masking of the waveform shaping signal of the angle signal S1. At the same time, as described as function (E), the logic circuit section 31 supplies the CPU 32 with the waveform shaping signal as the signal S2, instead of producing the ignition signal by itself.

FIG. 8I shows the signal S2 given to the CPU 32. The CPU 32 calculates the ignition timing on the basis of the signal S2 thus input, and generates the ignition signal S41 from the port P4 in response to the signal S2. The ignition signal S41 is supplied to the drive transistor 34 via the output control circuit 33. Thus, the ignition plug 5 is actuated at the timing indicated by arrows in FIG. 8I.

It may happen for some reasons that the mask time Th, determined by the logic circuit section 31, elapses before the CPU 32 generates the mask release command S3. In such a case, as described as function (C), the logic circuit section 31 itself produces the ignition signal S42 shown in FIG. 8F. The ignition signal S42, like the ignition signal S41, is given to the drive transistor 34 via the output control circuit 33. Thus, the ignition plug 5 is actuated at the timing indicated by an arrow in FIG. 8F. If both the ignition signals S41 and S42 are generated at the same time, the output control circuit 33 selects one of them and neglects the other.

Furthermore, it is presumed that the angle signal S1 or its waveform shaping signal may be accidentally eliminated after it is once generated. If the angle signal S1 or its waveform shaping signal is eliminated after the time Ts has elapsed, the logic circuit section 31 restarts the masking operation during the time Th from the detection of the first change of next arriving angle signal S1 or its waveform shaping signal, as described as function (D).

FIGS. 9A–9E show the mask processing executed by the first embodiment apparatus in the event that the starter section causes the chattering.

Let us assume that the battery voltage Vs has caused large fluctuations X1, X2 and X3 exceeding the predetermined value in a repetitive manner due to the chattering in the engine start-up operation, as shown in FIG. 9A. In this case, the angle signal S1 is added noises N1, N2 and N3 in response to these fluctuations X1, X2 and X3 as shown in FIG. 9D. Thus, the waveform shaping signal of the angle signal S1 produces erroneous detection pulses DP1, DP2 and DP3 based on the noises N1, N2 and N3, as shown in FIG. 9E. Appearance of these erroneous detection pulses DP1, DP2 and DP3 induces erroneous consecutive ignition signals which make the engine ignite mistakenly.

To solve the problem of such chattering phenomenon, the first embodiment apparatus effects the mask processing shown in FIG. 5 using the CPU 32. More specifically, the CPU 32 sets the mask time Tc1, Tc2 and Tc3 repetitively in response to each detection of the fluctuations X1, X2 and X3 of the battery voltage Vs, as shown in FIG. 9B. Thus, the actual masking operation, starting at the beginning of the first mask time Tc1 and ending at the termination of the third mask time Tc3, is so largely elongated that all the fluctuations X1, X2 and X3 of the battery voltage can be covered completely as shown in FIG. 9C. Consequently, all the erroneous detection signals DP1, DP2 and DP3 are adequately masked. Once the chattering is ceased, generation of the ignition signal is started based on the waveform shaping signal obtained after releasing the masking processing.

Although the mask time Th produced by the logic circuit 31 is not shown in FIGS. 9A-9E, it is assumed that the mask time Th is fairly larger than the total mask time of the CPU 32. Thus, even if the mask release command S3 produced by the CPU 32 is a little bit delayed due to the chattering, it is surely prevented that the logic circuit section 31 generates the ignition signal during before the CPU 32 completes the masking operation.

As explained in the foregoing description, according to the ignition control apparatus in accordance with the first embodiment of the present invention:

(I) When the noise is added to the angle signal S1 in an engine start-up operation, the angle signal S1 (and its waveform shaping signal S2) is surely and effectively masked until either the mask time Th or the mask time Tc is terminated.

(II) Accordingly, it is prevented that the CPU 32 generates an erroneous ignition signal. Even if the mask time Tc determined by the CPU 32 is fairly large, the masking processing by the logic circuit section 31 ends sufficiently earlier, thereby assuring satisfactory start-up operation.

(III) The mask time Tc of the CPU 32 is dynamically determined in accordance with each fluctuation of the battery voltage Vs. Thus, the mask time Tc can be selected to be an optimum value fitting to each start-up condition of the engine. If the mask time Tc is set shorter, the start-up ability of the engine is correspondingly increased.

(IV) When the angle signal S1 is eliminated after the time Ts has elapsed and thereafter is again entered into the logic circuit section 31, consideration should be given to the noises added to the angle signal S1 in such a case. To solve this problem, the present embodiment apparatus executes the mask processing using the logic circuit section 31 in response to the re-entry of the angle signal S1. Hence, the erroneous operation caused by the re-entry of the angle signal S1 is surely avoided.

(V) When the chattering is generated in the start-up operation, the CPU 32 repeats the masking operation in response to the continuation of the chattering. Thus, even if the chattering continues for a long time causing consecutive and repetitive noises to be added to the angle signal S1, the mask processing can cover such an elongated duration. Then, after the chattering is ceased, the production of the ignition signal is started based on the angle signal S1 (the waveform shaping signal) obtained after termination of the masking processing.

In the above first embodiment apparatus, the battery voltage Vs is monitored to detect the fluctuation amount X larger than the predetermined value, for allowing the CPU 32 to trigger the mask processing. However, the parameter to be monitored can be replaced by a starter voltage Vm applied to the relay coil 9a of the starter relay 9.

FIG. 8J shows the starter voltage Vm which causes fluctuation after the starter switch 8 is turned on. For example, the mask processing can be started when the fluctuation amount Y exceeds a predetermined value, obtaining the same effect as the above mask processing. If the starter voltage Vm is 0 volt at the time the fluctuation amount Y is detected, it is presumed that the engine is stopped. Otherwise, it is presumed that the start-up operation by the starter section is finished and the engine is rotating completely. In such a case, the mask processing is omitted.

As well as the starter voltage Vm, a starter current flowing through the starter section can be used as parameter to be monitored. The starter current causes fluctuation in synchronism with the starter voltage Vm. Therefore, monitoring the starter current makes it possible to realize the mask processing similar to the above-described mask processing.

Figure 11:
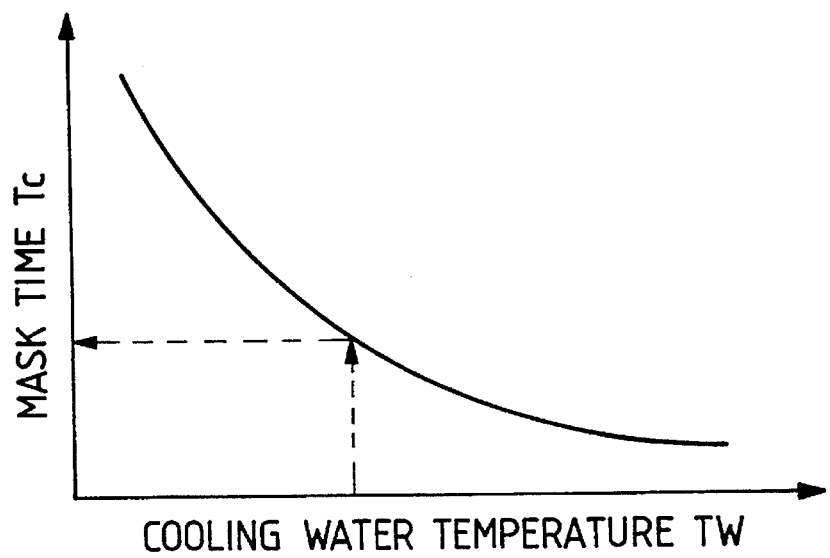
FIG. 11 is a map showing the relationship between the cooling water temperature TW and the mask time Tc.

According to the above first embodiment apparatus, the mask time Tc of the CPU 32 is determined in accordance with the fluctuation amount X of the battery Vs. However, it will be possible to use the engine cooling temperature as parameter determining the mask time Tc. As indicated by a dotted line in FIG. 1, a cooling water temperature sensor 11 would be connected to the CPU 32. Based on the cooling water temperature TW detected by the cooling water temperature sensor 11, the mask time Tc can be determined for example referring to a map of FIG. 11. Thus, in the same manner as the above-described embodiment, an appropriate mask time Tc can be obtained.

To increase accuracy of the mask processing, it will be preferable that the predetermined value for judging a large fluctuation of the battery voltage Vs can be set variable in response to the cooling water temperature information.

It is also possible to set the mask time Th of the logic circuit section 31 variable in response to the cooling water temperature.

For example, the cooling water temperature is compared with a given threshold value. Depending on the result of comparison, i.e. depending on whether the cooling water temperature is larger than the given threshold value, the counting condition for outputting an H-level signal from the counter 3104 is changed.

Or, the counter 3104 can be constituted by a preset counter, so that its preset value is selectively set in accordance with the cooling water temperature.

A clock generator, outputting a clock signal whose pulse period is variable in accordance with the cooling water temperature, would be adopted to supply its output as the clock signal CLK to the AND circuit 3103.

In the above first embodiment apparatus, both the time Th and time Ts to be set in the logic circuit section 31 are counted using the same clock signal CLK. However, these time Th and time Ts can be set or counted independently. Thus, the clock signal CLK can be different for each of the time Th and time Tc.

The arrangement of the logic circuit section 31 is not limited to the one disclosed in FIG. 1 and, therefore, can be variously modified as long as the above-listed functions (A)-(E) are realized.

The above first embodiment apparatus uses two different ignition signal generating means constituted by the logic circuit section 31 and the CPU 32, respectively. Thus, a means for prohibiting the ignition signal from being generated based on an erroneous detection pulse is provided for each of the logic circuit section 31 and the CPU 32.

Thus, at least in the CPU 32, the battery voltage or its related parameter is monitored, and there is provided a means for prohibiting the angle signal S1 from being supplied to the ignition signal generating means for a predetermined time from the detection of a predetermined amount large fluctuation of such a parameter. Accordingly, meaningless cranking can be surely prevented regardless of occurrence of chattering, properly executing the mask processing of the angle signal for a duration noises are possibly added to the angle signal.

In this case, the duration time for prohibiting the angle signal S1 from entering the ignition signal generating means can be a fixed time, otherwise a variable time in accordance with the variation amount of the above parameter or the cooling water temperature.

Effect of determining the start timing of the mask processing based on the detection of a predetermined value fluctuation of the battery voltage or its related parameter detecting is as follows:

The start timing of the mask processing can be always stabilized regardless of aging of battery or whatever the voltage is at the timing of ignition-on.

The fluctuation of the parameter, such as battery voltage, can be detected with reference to substantially the same judgement value. It means that the judgement value needs not be adjusted in accordance with the type of each vehicle on which the ignition timing control system is to be installed.

Second Embodiment

A second embodiment of the ignition timing control apparatus for an internal combustion engine will be explained below.

An overall arrangement of the second embodiment is the same as that disclosed in FIG. 1. Namely, both the logic circuit section 31 and the CPU 32, cooperatively constituting the ignition timing control device 3, have a function of masking the angle signal S1 during a predetermined duration that noises are possibly added to the angle signal S1. The components of FIG. 1 are already explained in the description of the first embodiment and, thus, will be not explained again.

Figure 12:
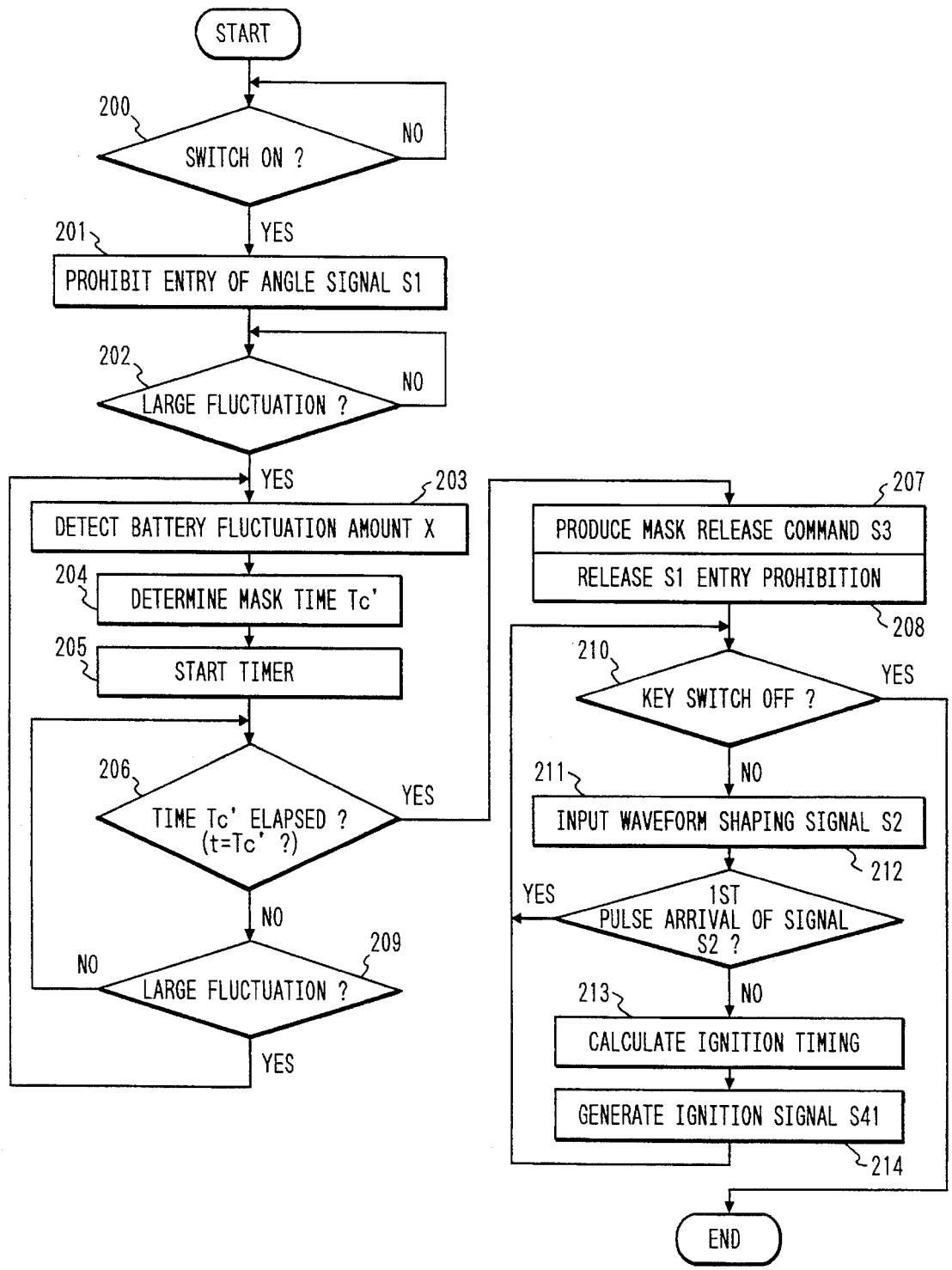
FIG. 12 is a flowchart showing the processing procedure of the CPU of an ignition timing control apparatus for an internal combustion engine in accordance with the second embodiment of the present invention.

In the second embodiment, the logic circuit section 31 has the functions (A)–(E) previously described, while the CPU 32 executes the processing shown in the flowchart of FIG. 12, which is memorized in a built-in memory or a detachable memory of the CPU 32.

Next, operation and function of the CPU 32, acting as one ignition signal generating means constituting the ignition timing control device 3, will be explained with reference to FIG. 12.

First of all, the CPU 32 makes a judgement in a step 200 as to whether the key switch 2 and the starter switch 8 are turned on or the electric power unit is turned on. This step 200 is repeated until the judgement result turns to "YES". If the judgement is "YES" in the step 200, the CPU 32 proceeds to a step 201 to prohibit the port P2 from inputting the angle signal (i.e. the waveform shaping signal S2). Then, the CPU 32 makes a judgement in a step 202 as to whether the battery voltage Vs causes a fluctuation larger than a predetermined value. This step 202 is repeated until the judgement result turns to "YES". If the judgement is "YES" in the step 202, the CPU 32 proceeds to a step 203 to detect a fluctuation amount X of the battery voltage Vs. The battery voltage Vs generally causes a large variation in response to the actuation of the starter section as shown in FIG. 6A. The degree of variation is generally dependent on the temperature.

Taking account of the fluctuation amount X of the battery voltage Vs thus detected, the CPU 32 determines a mask time Tc' in a step 204. The mask time Tc' is an optimum time required to mask the noises caused by the fluctuation of the battery voltage Vs, and is determined using a map as shown in FIG. 7, with reference to the battery voltage fluctuation X.

Based on the mask time Tc' thus determined, the CPU 32 starts the mask processing in a step 205. More specifically, the CPU 32 resets the time information t of a timer (i.e. t=0) and starts the operation of timer for measuring the mask time Tc'.

Using the time information t of the mask time Tc' measuring timer, the CPU 32 makes a judgement in a step 206 as to whether the mask time Tc' has elapsed or not. If the judgement is "NO" in the step 206, the CPU 32 proceeds to a step 209 to further make a judgement as to whether the battery voltage Vs causes a fluctuation larger than the predetermined value. In short, the CPU 32 continuously monitors the fluctuation of the battery voltage Vs until the mask time Tc' has elapsed completely. If the judgement is "YES" in the step 209, the CPU 32 returns to the step 203 to detect the new fluctuation amount X and then proceeds to the step 204 to renew the mask time Tc', and thereafter restarts the mask processing in the step 205. Thus, the steps 203–205 are repeated every time the battery voltage Vs causes the fluctuation more than the predetermined value. If the judgement is "NO" in the step 209, the CPU 32 returns to the step 206.

When the judgement is "YES" in the step 206, the CPU 32 proceeds to a step 207 to generate the mask release command S3 from the port P3 to the logic circuit section 31. The generation of the mask release command S3 has a function of releasing the command of prohibiting the angle signal (i.e. the waveform shaping signal S2) from entering into the port P2. (Step 208) Thus, the waveform shaping signal S2 of the angle signal S1 is allowed to enter from the logic circuit section 31 to the port P2.

Next, the CPU 32 makes a judgement in a step 210 as to whether the key switch 2 is turned off or not. If the key switch 2 is turned on, the CPU 32 proceeds to a step 211 to input the waveform shaping signal S2. Then, the CPU 32 makes a judgement in a step 212 as to whether it is the first pulse of the waveform shaping signal S2. If the judgement is "YES" in the step 212, the CPU 32 returns to the step 210. Namely, the CPU 32 neglects the first pulse of the waveform shaping signal S2. This neglect is given from the consideration to the fact the first pulse is almost an erroneous detection pulse due to vibration noises in the engine start-up operation. If the judgement is "NO" in the step 212, the CPU 32 proceeds to a step 213 to calculate the ignition timing on the basis of the change timing of the waveform shaping signal S2 (Step 213) and generates the ignition signal S41 which is output through the port P4 to the output control circuit 33 (Step 214). Meanwhile, if the key switch 2 is turned off, the CPU 32 ends the processing of this routine.

FIGS. 13A–13I are time charts showing operation of the second embodiment apparatus.

When the key switch 2 and the starter switch 8 are both turned on as illustrated in FIG. 8A, the relay coil 9a of the starter relay 9 is energized to close the relay contact 9b. Upon closing of the relay contact 9b, the output voltage Vs of the battery 1 is applied to the starter motor 10, thereby starting up the engine.

Figure 13:
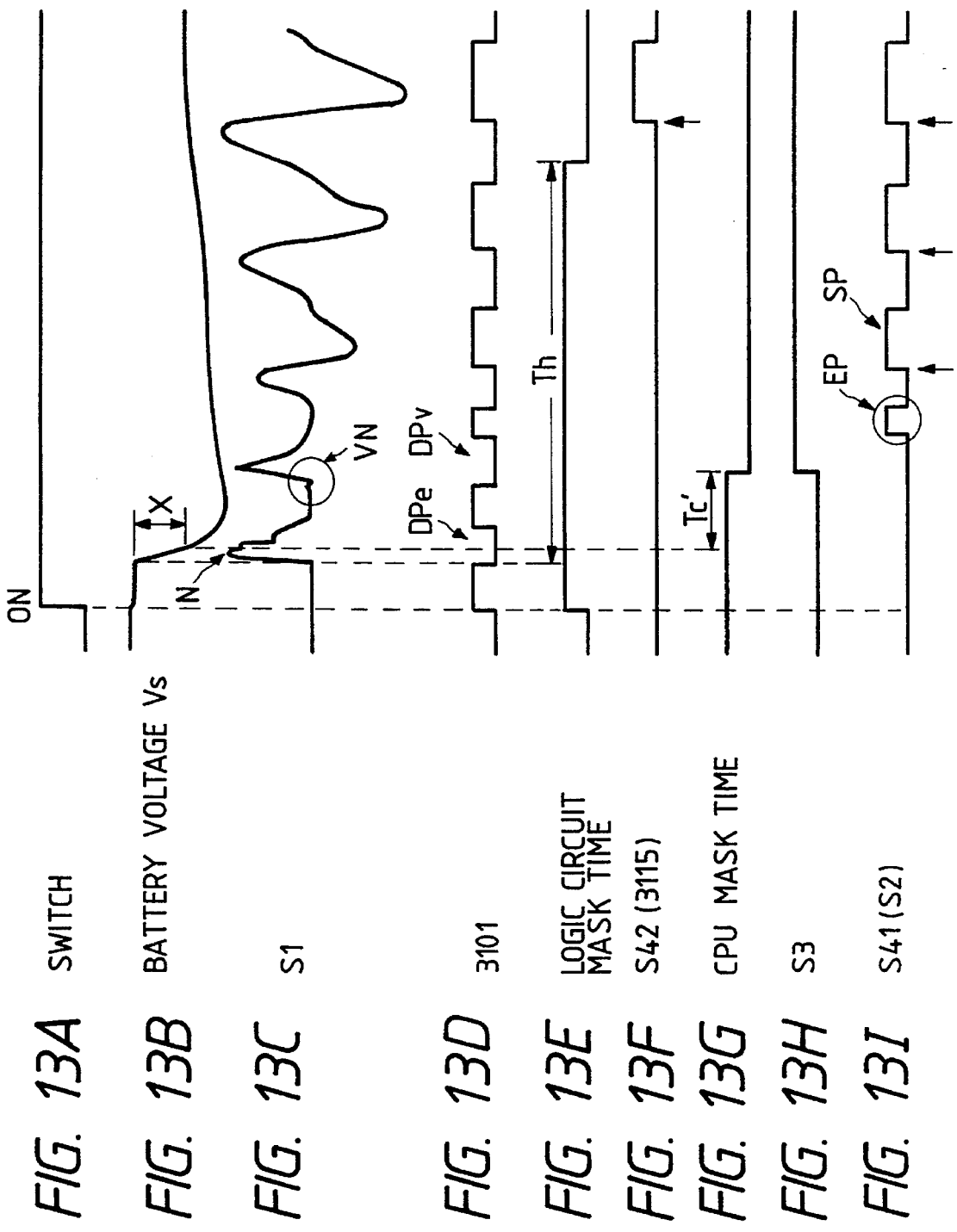
FIGS. 13A–13I are time charts showing the ignition timing control operation of the second embodiment apparatus.

After the engine starts rotating, the pickup sensor 7 generates the angle signal S1 in synchronism with rotation of the engine. In an engine start-up operation, the voltage Vs of the battery 1 causes a large fluctuation as shown in FIG. 13B. Such a fluctuation adds the electromagnetic noise N onto the angle signal S1, as shown in FIG. 13C.

Actually, the vibration noise VN occurring when the engine start rotating is also added to the angle signal S1 as shown in FIG. 13C.

When the electromagnetic noise N and the vibration noise VN are added to the angle signal S1, erroneous detection pulses DPe and DPv appear on the waveform shaping signal produced from the waveform shaping circuit 3101, as shown in FIG. 13D. In general, this kind of erroneous detection pulses DPe and DPv induce erroneous ignition signals which make the engine ignite mistakenly.

Thus, the second embodiment apparatus prohibits the generation of ignition signals in response to such erroneous detection pulses DPe and DPv, effecting the above-described masking processing using either the logic circuit section 31 or the CPU 32.

Namely, as described as the function (B), the logic circuit section 31 sets the mask time (Th+α) shown in FIG. 13E for masking the waveform shaping signal of the angle signal S1 shown in FIG. 13D. The time α corresponds to a time duration from the turning-on of the key switch 2 and the starter switch 8 to the detection of the first edge of the waveform shaping signal.

On the other hand, the CPU 32 sets the mask time Tc' shown in FIG. 13G based on the fluctuation amount X of the battery voltage Vs shown in FIG. 13B for masking the waveform shaping signal of the angle signal S1 shown in FIG. 13D. The mask time Tc' is determined to be sufficient to surely mask the erroneous detection pulse DPe. Furthermore, in this embodiment, the mask time Tc' determined by the CPU 32 has the following relationship to the mask time Th determined by the logic circuit section 31.

$$Tc' < Th \qquad (2)$$

Accordingly, if the battery voltage Vs is not later encountered with the fluctuation exceeding the predetermined value, the CPU 32 generates the mask release command S3 shown in FIG. 13H after the mask time Tc' has elapsed since it is set by the CPU 32 at the time the key switch 2 and the starter switch 8 are both turned on.

In response to the mask release command S3 generated from the CPU 32, the logic circuit section 31 releases the masking of the waveform shaping signal of the angle signal S1. At the same time, as described as function (E), the logic circuit section 31 supplies the CPU 32 with the waveform shaping signal as the signal S2, instead of producing the ignition signal by itself.

FIG. 13I shows the signal S2 given to the CPU 32. As described above, the CPU 32 neglects the first pulse FP of the waveform shaping signal S2. The first pulse FP is generally generated in correlation to an erroneous detection pulse DPv generated due to the vibration noise VN. Thus, neglecting the first pulse FP assures to prevent the ignition operation from being executed based on the erroneous detection pulse DPv.

Then, the CPU 32 calculates the ignition timing on the basis of the second pulse SP of the signal S2, and generates the ignition signal S41 from the port P4 in response to the signal S2. The ignition signal S41 is supplied to the drive transistor 34 via the output control circuit 33. Thus, the ignition plug 5 is actuated at the timing indicated by arrows in FIG. 13I.

It may happen for some reasons that the mask time Th, determined by the logic circuit section 31, elapses before the CPU 32 generates the mask release command S3. In such a case, as described as function (C), the logic circuit section 31 itself produces the ignition signal S42 shown in FIG. 13F. This ignition signal S42, like the ignition signal S41, is given to the drive transistor 34 via the output control circuit 33. Thus, the ignition plug 5 is actuated at the timing indicated by an arrow in FIG. 13F.

In this manner, according to the ignition timing control apparatus in accordance with the second embodiment, the CPU 32 acting as one ignition signal generating means executes the masking of the first pulse FP of the waveform shaping signal (i.e. angle signal) arriving after the mask processing, in addition to the above-described mask processing executed during the designated mask time Tc'.

More specifically, the second embodiment apparatus classifies the noises added onto the angle signal S1 into the electromagnetic noise N, which is generated in response to actuation of the starter section, and the vibration noise VN, which is generated in response to rotation of engine. The former electromagnetic noise N is masked by the mask processing of mask time Tc'. After the above time Tc' mask processing is completed, the latter vibration noise VN is masked by neglecting the first arriving pulse FP of the waveform shaping signal (i.e. angle signal) as an erroneous detection pulse. In short, the second embodiment apparatus is characterized by the two-stage mask processing as described above.

Accordingly, in addition to the previously described effects (I)–(V), the second embodiment apparatus has the following effects:

(VI) It is not necessary to set a margin to be added to the mask time Tc' considering dispersion of initial engine rotating timing or generation of chattering. More specifically, the mask time Tc', determined by the CPU 32, can be set for solely masking the electromagnetic noise N. In other words, the mask time Tc' of the second embodiment can be effectively shorten compared with the mask time Tc of the first embodiment. It means that the start-up ability of engine is remarkably improved.

For example, the mask time Tc of the first embodiment would be set somewhere in a range of 20–50 msec. Because, the electromagnetic noise is generally caused within 20 msec from the occurrence of fluctuation of the parameter, such as the battery voltage, while the vibration noise is generated within 50 msec. On the contrary, the mask time Tc' of the second embodiment does not need to take the vibration noise into consideration. Thus, the mask time Tc' can be set to a shorter value equal to or less than 20 msec.

The above-described second embodiment neglects only the first pulse FP of the waveform shaping signal for masking the vibration noise VN. However, it is also preferable to neglect the succeedingly arriving two or three pulses together with the first pulse FP. Alternatively, validity of pulse signals can be judged by checking an edge of each pulse. In any event, it will be satisfactory if the first pulse arriving after completing the mask processing of mask time Tc' is masked. Thus, adverse effect of the erroneous detection pulse derived from the vibration noise VN is surely eliminated.

If both the ignition signals S41 and S42 are generated at the same time, the output control circuit 33 selects one of them and neglects the other.

Furthermore, it is presumed that the angle signal S1 or its waveform shaping signal may be accidentally eliminated after it is once generated. If the angle signal S1 or its waveform shaping signal is eliminated after the time Ts has elapsed, the logic circuit section 31 restarts the masking operation during the time Th from the detection of the first change of next arriving angle signal S1 or its waveform shaping signal, as described as function (D).

When the starter section causes the chattering, the mask time Tc' is set repetitively in response to each occurrence of a fluctuation of the battery voltage more than a predetermined value. Thus, it becomes possible to mask the erroneous detection pulse to be generated due to the chattering.

In the above second embodiment apparatus, the battery voltage Vs is monitored to detect the fluctuation amount X larger than the predetermined value, for allowing the CPU 32 to trigger the mask processing. However, the parameter to be monitored can be replaced by the starter voltage Vm applied to the relay coil 9a of the starter relay 9.

As well as the starter voltage Vm, the starter current flowing through the starter section can be used as the parameter to be monitored.

The start timing of the mask processing can be always stabilized regardless of aging of battery or whatever the voltage is at the timing of ignition-on.

The fluctuation of the parameter, such as battery voltage, can be detected with reference to substantially the same judgement value. It means that the judgement value needs not be adjusted in accordance with the type of each vehicle on which the ignition timing control system is to be installed.

It is possible to provide a cooling water temperature sensor to vary the mask time Tc' of the CPU 32 or the mask time Th of the logic circuit section 31 in accordance with the cooling water temperature.

Although, in the above second embodiment apparatus, both the time Th and time Ts to be set in the logic circuit section 31 are counted using the same clock signal CLK. However, these times Th and Ts can be set or counted independently.

Furthermore, as far as the above functions (A)–(E) are realized, any modification will be acceptable.

The above second embodiment apparatus uses two different ignition signal generating means constituted by the logic circuit section 31 and the CPU 32, respectively. Thus, a means for prohibiting the ignition signal from being generated based on an erroneous detection pulse is provided for each of the logic circuit section 31 and the CPU 32.

Thus, at least in the CPU 32, the battery voltage or its related parameter is monitored, and there is provided a means for prohibiting the angle signal S1 from being supplied to the ignition signal generating means for a predetermined time from the detection of a predetermined amount large fluctuation of such a parameter. And, there is also provided a means for canceling at least first arriving edge of the angle signal to be supplied to the ignition signal generating means after completion of the predetermined mask time.

Accordingly, meaningless cranking can be surely prevented regardless of occurrence of chattering, properly executing the mask processing of the angle signal for a duration noises are possibly added to the angle signal. Furthermore, engine start-up ability is greatly improved.

In this case, the duration prohibiting the angle signal S1 from entering the ignition signal generating means can be a fixed time, otherwise a variable time in accordance with the variation amount of the above parameter or the cooling water temperature.

Third Embodiment

A third embodiment of the ignition timing control apparatus for an internal combustion engine will be explained below.

An overall arrangement of the third embodiment is the same as that disclosed in FIG. 1. Namely, both the logic circuit section 31 and the CPU 32, cooperatively constituting the ignition timing control device 3, have a function of masking the angle signal S1 during a predetermined duration that noises are possibly added to the angle signal S1. The components of FIG. 1 are already explained in the description of the first embodiment and, thus, will be not explained again.

In general, the magnitude or duration of an electromagnetic noise, or occurrence of the chattering, is greatly dependent on a tiny voltage variation (i.e. reduction) vx of the battery voltage Vs which is found in the duration from the turning-on operation of switch to the initiation of cranking, as explained with reference to FIG. 6B.

Accordingly, the third embodiment monitors such a tiny voltage variable vx of the battery voltage Vs to estimate the occurrence of the chattering based on the detection value of the voltage variation vx. The voltage variation vx is proportional to an electric current value flowing through the starter motor 10 in the duration from the turning-on operation of switch to the initiation of cranking.

Figure 14:
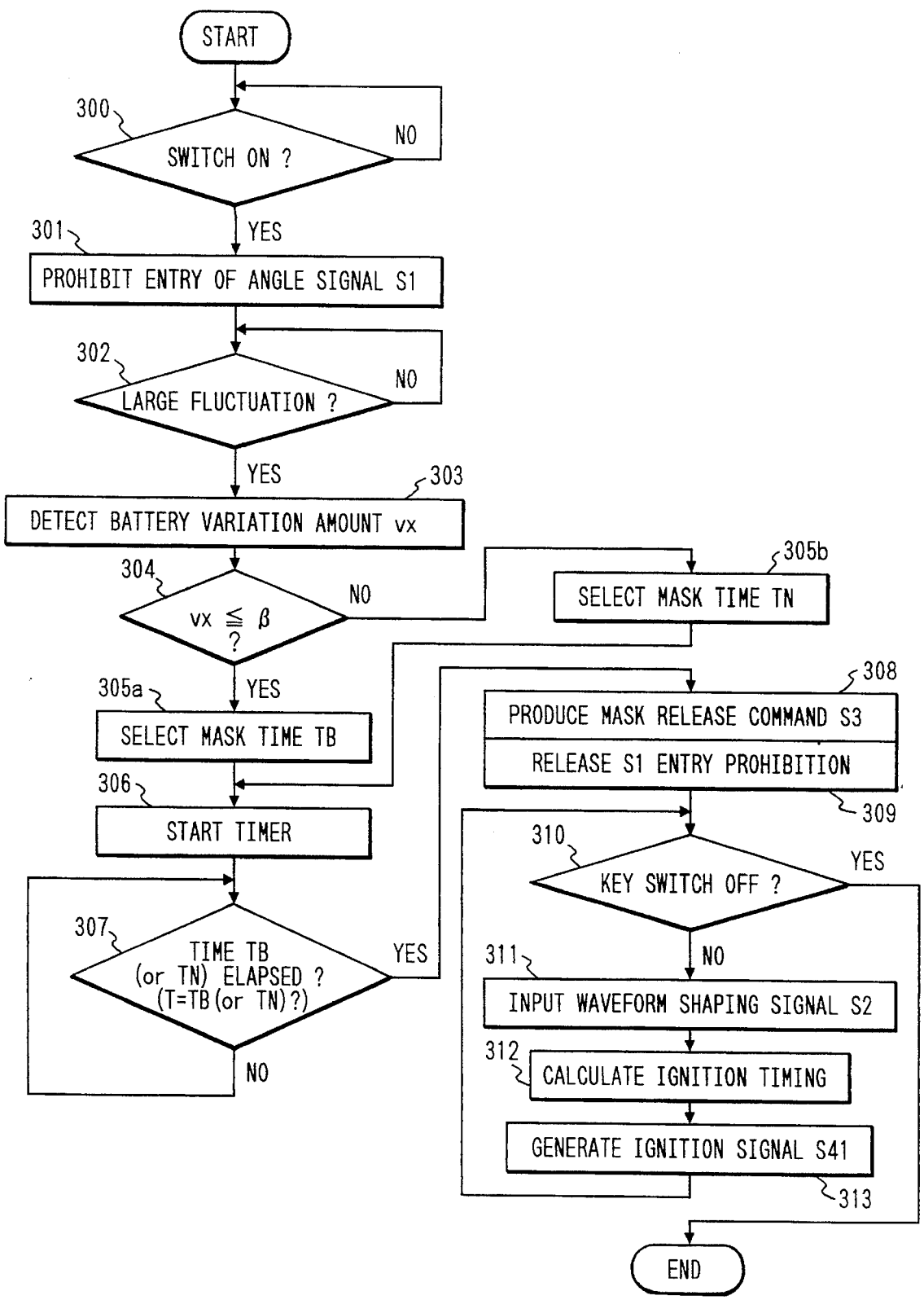
FIG. 14 is a flowchart showing the processing procedure of the CPU of an ignition timing control apparatus for an internal combustion engine in accordance with the third embodiment of the present invention.

In the third embodiment, the logic circuit section 31 has the functions (A)–(E) previously described, while the CPU 32 executes the processing shown in the flowchart of FIG. 14, which is memorized in a built-in memory or a detachable memory of the CPU 32.

Next, operation and function of the CPU 32, acting as one ignition signal generating means constituting the ignition timing control device 3, will be explained with reference to FIG. 14.

First of all, the CPU 32 makes a judgement in a step 300 as to whether the key switch 2 and the starter switch 8 are turned on or the electric power unit is turned on. This step 300 is repeated until the judgement result turns to "YES". If the judgement is "YES" in the step 300, the CPU 32 proceeds to a step 301 to prohibit the port P2 from inputting the angle signal (i.e. the waveform shaping signal S2). Then, the CPU 32 makes a judgement in a step 302 as to whether the battery voltage Vs causes a tiny fluctuation larger than a predetermined value. This step 302 is repeated until the judgement result turns to "YES". If the judgement is "YES" in the step 302, the CPU 32 proceeds to a step 303 to detect a fluctuation amount vx of the battery voltage Vs. As described above, occurrence of chattering is dependent on this tiny voltage variation vx. FIGS. 15A–15D show details of such a voltage fluctuation.

FIGS. 15A and 15B show the battery voltage Vs (i.e. voltage variation vx) and the angle signal S1 under the condition that no chattering is generated. On the contrary, FIGS. 15C and 15D show the battery voltage Vs (i.e. voltage variation vx) and the angle signal S1 under the condition that the chattering is generated.

As apparent from FIGS. 15A and 15C, the voltage variation vx is increased when the chattering is generated. This phenomenon was confirmed by the inventors of this application. A threshold level $\beta$ is set to discriminate the occurrence of chattering. Namely, when the voltage variation vx exceeds the threshold level $\beta$, it is assumed that the chattering is generated. In short, the threshold level $\beta$ is used to judge a noise duration during which the angle signal S1 is possibly added noises.

Thus, the CPU 32 makes a judgement in a step 304 as to whether the voltage variable vx is not larger than the threshold value β. If the judgement result is "YES" (i.e. vx≦β), the CPU 32 proceeds to a step 305a to set a mask time TB under the assumption that no chattering will be generated. On the other hand, if the judgement result is "NO" (i.e. vx>β), the CPU 32 proceeds to a step 305b to set another mask time TN under the assumption that the chattering will be possibly generated.

These mask times TB and TN, respectively stored in the memory for an optimum value required for masking the noises in each of the non-chattering condition and the chattering condition, have the following relationship.

$$TB<TN \quad (3)$$

Based on the mask time TB or TN thus determined, the CPU 32 starts the mask processing in a step 306. More specifically, the CPU 32 resets the time information t of a timer (i.e. t=0) and starts the operation of timer for measuring the mask time TB or TN.

Using the time information t of the mask time measuring timer, the CPU 32 makes a judgement in a step 307 as to whether the mask time TB or TN has elapsed or not. The CPU 32 repeats the step 307 until the judgement result turns to "YES". If the judgement is "YES" in the step 307, the CPU 32 proceeds to a step 308 to generate the mask release command S3 from the port P3 to the logic circuit section 31. The generation of the mask release command S3 has a function of releasing the command of prohibiting the angle signal (i.e. the waveform shaping signal S2) from entering into the port P2. (Step 309) Thus, the waveform shaping signal S2 of the angle signal S1 is allowed to enter from the logic circuit section 31 to the port P2.

Next, the CPU 32 makes a judgement in a step 310 as to whether the key switch 2 is turned off or not. If the key switch 2 is turned on, the CPU 32 proceeds to a step 311 to input the waveform shaping signal S2. Then, the CPU 32 proceeds to a step 312 to calculate the ignition timing on the basis of the change timing of the waveform shaping signal S2 (Step 312) and generates the ignition signal S41 which is output through the port P4 to the output control circuit 33 (Step 313). Meanwhile, if the key switch 2 is turned off, the CPU 32 ends the processing of this routine.

FIGS. 16A–16I are time charts showing operation of the third embodiment apparatus.

When the key switch 2 and the starter switch 8 are both turned on as illustrated in FIG. 16A, the relay coil 9a of the starter relay 9 is energized to close the relay contact 9b. Upon closing of the relay contact 9b, the output voltage Vs of the battery 1 is applied to the starter motor 10, thereby starting up the engine.

After the engine starts rotating, the pickup sensor 7 generates the angle signal S1 in synchronism with rotation of the engine. In an engine start-up operation, the voltage Vs of the battery 1 causes a tiny voltage variation vx as shown in FIG. 13B. By monitoring such a tiny voltage variation vx, the occurrence of the chattering is estimated. FIG. 16C shows the waveform signal of the angle signal S1 under the condition that no chattering is generated. The electromagnetic noise N is added onto the angle signal S1, as shown in FIG. 16C.

Figure 16D:
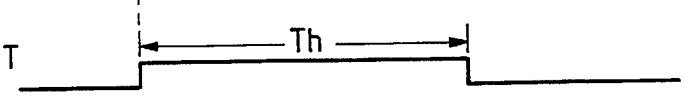

When the electromagnetic noise N is added to the angle signal S1, an erroneous detection pulse DP appears on the waveform shaping signal produced from the waveform shaping circuit 3101, as shown in FIG. 16D. In general, this kind of erroneous detection pulse DP induce an erroneous ignition signal which makes the engine ignite mistakenly.

Thus, the third embodiment apparatus prohibits the generation of an ignition signal in response to such an erroneous detection pulse DP, effecting the above-described masking processing using either the logic circuit section 31 or the CPU 32.

Namely, as described as the function (B), the logic circuit section 31 sets the mask time (Th+α) shown in FIG. 16E for masking the waveform shaping signal of the angle signal S1 shown in FIG. 16D. The time a corresponds to a time duration from the turning-on of the key switch 2 and the starter switch 8 to the detection of the first edge of the waveform shaping signal.

On the other hand, the CPU 32 sets the mask time TB or TN shown in FIG. 16G based on the voltage variation vx of the battery voltage Vs shown in FIG. 16B for masking the waveform shaping signal of the angle signal S1 shown in FIG. 16D. The mask time TB is a relatively short time required for surely masking one erroneous detection pulse DP when no chattering is generated. On the other hand, the mask time TN is a relatively long time required for surely masking a plurality of erroneous detection pulses consecutively occurring when the chattering is generated (Refer to DP1–DP3 in FIG. 9). The longer mask time TN has the following relationship to the mask time Th determined by the logic circuit section 31.

$$TN<Th \quad (4)$$

Accordingly, when the CPU 32 sets the mask time TB based on the estimation that no chattering is generated, the CPU 32 generates the mask release command S3 indicated by a solid line in FIG. 16H after the mask time TB has elapsed since it is set by the CPU 32 at the time the key switch 2 and the starter switch 8 are both turned on.

On the other hand, when the CPU 32 sets the mask time TN based on the estimation that the chattering is generated, the CPU 32 generates the mask release command S3 indicated by a dotted line in FIG. 16H after the mask time TN has elapsed since it is set by the CPU 32 at the time the key switch 2 and the starter switch 8 are both turned on.

In response to the mask release command S3 generated from the CPU 32, the logic circuit section 31 releases the masking of the waveform shaping signal of the angle signal S1. At the same time, as described as function (E), the logic circuit section 31 supplies the CPU 32 with the waveform shaping signal as the signal S2, instead of producing the ignition signal by itself.

FIG. 16I shows the signal S2 given to the CPU 32. Then, the CPU 32 calculates the ignition timing on the basis of the signal S2 thus entered, and generates the ignition signal S41 from the port P4 in response to the signal S2. The ignition signal S41 is supplied to the drive transistor 34 via the output control circuit 33. Thus, the ignition plug 5 is actuated at the timing indicated by arrows in FIG. 16I.

It may happen for some reasons that the mask time Th, determined by the logic circuit section 31, elapses before the CPU 32 generates the mask release command S3. In such a case, as described as function (C), the logic circuit section 31 itself produces the ignition signal S42 shown in FIG. 16F. This ignition signal S42, like the ignition signal S41, is given to the drive transistor 34 via the output control circuit 33. Thus, the ignition plug 5 is actuated at the timing indicated by an arrow in FIG. 16F.

In this manner, according to the ignition timing control apparatus in accordance with the third embodiment, the CPU 32 acting as one ignition signal generating means stores two different mask times—the mask time TB for the non-chattering condition and the mask time TN for the chattering condition, so that the mask time can be selectively set in accordance with the tiny voltage variation vx of the battery voltage Vs.

Accordingly, the third embodiment apparatus can always set an appropriate mask time regardless of the chattering caused by the starter section. Thus, the ignition operation is accurately executed by surely masking the erroneous detection pulses, suppressing meaningless cranking. Hence, a preferable start-up ability is assured for an engine.

An actual value of the mask time TB would be somewhere in a range of 20–50 msec.

Furthermore, the third embodiment can include a step of nullifying or canceling the first edge for adverse effect of the vibration noise, as is adopted in the above-described second embodiment. More specifically, the step 212 of FIG. 12 can be interposed between the steps 311 and 312 of FIG. 14. In such a case, the mask time TB can be further shorten to a smaller value like 20 msec.

In the above third embodiment, the occurrence of the chattering is estimated based on the tiny voltage variation vx of the battery voltage Vs. It is, however, possible to detect a tiny voltage variation of the starter voltage Vm which corresponds to the voltage variation vx of the battery voltage Vs. Therefore, the arrangement for detecting the tiny voltage variation vx of the battery voltage Vs can be replaced by an arrangement for detecting the tiny voltage variation of the starter voltage Vm. According to the experimental results, the voltage variation of the Starter voltage Vm is superior to that of the battery voltage Vs.

If both the ignition signals S41 and S42 are generated at the same time, the output control circuit 33 selects one of them and neglects the other.

Furthermore, if the angle signal S1 or its waveform shaping signal is eliminated after the time Ts has elapsed, the logic circuit section 31 restarts the masking operation during the time Th from the detection of the first change of next arriving angle signal S1 or its waveform shaping signal, as described as function (D).

Although, both the time Th and time Ts to be set in the logic circuit section 31 are counted using the same clock signal CLK in the above third embodiment. However, these times Th and Ts can be set or counted independently.

Furthermore, the arrangement of the logic circuit section 31 can be modified variously as far as the above functions (A)–(E) are realized.

The start timing of the mask processing can be always stabilized regardless of aging of battery or whatever the voltage is at the timing of ignition-on.

The fluctuation of the parameter, such as battery voltage, can be detected with reference to substantially the same judgement value. It means that the judgement value needs not be adjusted in accordance with the type of each vehicle on which the ignition timing control system is to be installed.

The above third embodiment apparatus uses two different ignition signal generating means constituted by the logic circuit section 31 and the CPU 32, respectively. Thus, a means for prohibiting the ignition signal from being generated based on an erroneous detection pulse is provided for each of the logic circuit section 31 and the CPU 32.

Thus, at least in the CPU 32, the battery voltage or its related parameter is monitored, and there is provided a means for estimating the noise duration during which noises are possibly added onto the angle signal in response to the detection of a predetermined amount large fluctuation.

A memory is also provided for storing a plurality of mask times selectable in accordance with the noise duration.

There is further provided a means for prohibiting the angle signal S1 from being supplied to the ignition signal generating means for a selected mask time since the predetermined amount large fluctuation of the parameter has been detected.

Accordingly, it become possible to respond to any change of the parameter, thus realizing a highly accurate mask processing. Thus, the present invention can provide an advanced general purpose ignition timing control apparatus.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An ignition timing control apparatus for an internal combustion engine comprising:

a signal rotor rotating in synchronism with a crank shaft of the internal combustion engine;

a pickup sensor disposed in a confronting relation to said signal rotor to generate an angle signal proportional to rotation of the internal combustion engine;

ignition signal producing means for calculating an ignition timing on the basis of said angle signal and generating an ignition signal for igniting said internal combustion engine; and time mask means for monitoring a parameter representative of a battery voltage, and prohibiting said angle signal from entering into said ignition signal producing means for a predetermined time in response to a detection of a predetermined amount fluctuation of said parameter.

2. The ignition timing control apparatus for an internal combustion engine in accordance with claim 1, wherein said time mask means varies said predetermined time in accordance with a fluctuation amount of said parameter.

3. The ignition timing control apparatus for an internal combustion engine in accordance with claim 1, further comprises cooling water temperature detecting means for detecting a cooling water temperature in an engine start-up condition, wherein said time mask means varies said predetermined time in accordance with the cooling water temperature detected by said cooling water temperature detecting means.

4. The ignition timing control apparatus for an internal combustion engine in accordance with claim 1, further comprises edge mask means for neglecting at least first arriving edge of said angle signal to be entered to said ignition signal producing means, after said predetermined time determined by said time mask means has elapsed.

5. An ignition timing control apparatus for an internal combustion engine comprising:

a signal rotor rotating in synchronism with a crank shaft of the internal combustion engine;

a pickup sensor disposed in a confronting relation to said signal rotor to generate an angle signal proportional to rotation of the internal combustion engine;

ignition signal producing means for calculating an ignition timing on the basis of said angle signal and generating an ignition signal for igniting said internal combustion engine;

noise duration estimating means for monitoring a parameter representative of a battery voltage and, when a variation amount of said parameter is larger than a predetermined value, estimating on the basis of said variation amount a noise duration during which said angle signal is possibly added noises;

a mask time memory for storing a plurality of mask times selectable in accordance with an estimated noise duration; and mask control means for selecting an optimum mask time among said mask times stored in said mask time memory in accordance with the estimated noise duration, and prohibiting said angle signal from entering into said ignition signal producing means for a selected mask time in response to a detection of a predetermined amount variation of said parameter.

6. The ignition timing control apparatus for an internal combustion engine in accordance with claim 5, wherein said noise duration estimating means estimates occurrence of chattering noises added to said angle signal in accordance with the variation amount of said parameter;

said mask time memory comprises a first mask time corresponding to a chattering condition and a second mask time corresponding to a non-chattering condition; and said mask control means selects said first mask time when occurrence of chattering noises is estimated by said noise duration estimating means, while said mask control means selects said second mask time when occurrence of chattering noises is not estimated by said noise duration estimating means.

7. The ignition timing control apparatus for an internal combustion engine in accordance with claim 5, further comprises edge mask means for neglecting at least first arriving edge of said angle signal to be entered to said ignition signal producing means after said predetermined time selected by said mask means has elapsed.

8. An ignition timing control apparatus for an internal combustion engine comprising:

a signal rotor rotating in synchronism with a crank shaft of the internal combustion engine;

a pickup sensor disposed in a confronting relation to said signal rotor to generate an angle signal proportional to rotation of the internal combustion engine;

first ignition signal producing means, operated by a software program, for calculating an ignition timing on the basis of said angle signal and generating a first ignition signal for igniting said internal combustion engine;

first time mask means for monitoring a parameter representative of a battery voltage, and prohibiting said angle signal from entering into said first ignition signal producing means for a first predetermined time in response to a detection of a predetermined amount fluctuation of said parameter;

second ignition signal producing means, constituted by hardware components, for generating a second ignition signal for igniting said internal combustion engine;

second time mask means for prohibiting said angle signal from entering into said second ignition signal producing means for a second predetermined time in response to a first change of said angle signal in an engine start-up condition, said second predetermined time being longer than said first predetermined time; and mask release means for, when either one of said first and second predetermined times has elapsed, releasing prohibition of entry of said angle signal into said ignition signal producing means corresponding to said either one of said first and second predetermined times.

9. The ignition timing control apparatus for an internal combustion engine in accordance with claim 8, wherein said first time mask means varies said first predetermined time in accordance with a fluctuation amount of said parameter.

10. The ignition timing control apparatus for an internal combustion engine in accordance with claim 8, further comprises cooling water temperature detecting means for detecting a cooling water temperature in an engine start-up condition, wherein at least one of said first and second time mask means varies the corresponding predetermined time in accordance with the cooling water temperature detected by said cooling water temperature detecting means.

11. The ignition timing control apparatus for an internal combustion engine in accordance with claim 8, further comprises edge mask means for neglecting at least first arriving edge of said angle signal to be entered to said first ignition signal producing means, after said first predetermined time determined by said first time mask means has elapsed.

12. The ignition timing control apparatus for an internal combustion engine in accordance with claim 8, further comprises first time mask means for prohibiting said angle signal from entering into said second ignition signal generating means for the second predetermined time in response to a first change of next arriving angle signal when said angle signal is terminated during a third predetermined time after said second predetermined time has elapsed.

13. The ignition timing control apparatus for an internal combustion engine in accordance with claim 8, further comprises output control means for selectively outputting one of said first and second ignition signals when said one arrives earlier than the other, and neglecting the other.

14. An ignition timing control apparatus for an internal combustion engine comprising:

a signal rotor rotating in synchronism with a crank shaft of the internal combustion engine;

a pickup sensor disposed in a confronting relation to said signal rotor to generate an angle signal proportional to rotation of the internal combustion engine;

first ignition signal producing means, operated by a software program, for calculating an ignition timing on the basis of said angle signal and generating a first ignition signal for igniting said internal combustion engine;

noise duration estimating means for monitoring a parameter representative of a battery voltage and, when a variation amount of said parameter is larger than a predetermined value, estimating on the basis of said variation amount a noise duration during which said angle signal is possibly added noises;

a mask time memory for storing a plurality of mask times selectable in accordance with an estimated noise duration;

mask control means for selecting an optimum mask time among said mask times stored in said mask time memory in accordance with the estimated noise duration, and prohibiting said angle signal from entering into said first ignition signal producing means for a selected mask time in response to a detection of a predetermined amount variation of said parameter;

second ignition signal producing means, constituted by hardware components, for generating a second ignition signal for igniting said internal combustion engine;

time mask means for prohibiting said angle signal from entering into said second ignition signal producing means for a predetermined time in response to a first change of said angle signal in an engine start-up condition, said predetermined time being longer than said selected mask time; and mask release means for, when either one of said selected mask time and said predetermined time has elapsed, releasing prohibition of entry of said angle signal into said ignition signal producing means corresponding to said either one of said selected mask time and said predetermined time.

15. The ignition timing control apparatus for an internal combustion engine in accordance with claim 14, wherein said noise duration estimating means estimates occurrence of chattering noises added to said angle signal in accordance with the variation amount of said parameter;

said mask time memory comprises a first mask time corresponding to a chattering condition and a second mask time corresponding to a non-chattering condition; and said mask control means selects said first mask time when occurrence of chattering noises is estimated by said noise duration estimating means, while said mask control means selects said second mask time when occurrence of chattering noises is not estimated by said noise duration estimating means.

* * * * *